US008019162B2

(12) United States Patent  (10) Patent No.: US 8,019,162 B2
Zhang et al.  (45) Date of Patent:  Sep. 13, 2011

(54) METHODS AND APPARATUS FOR DETECTING ON-SCREEN MEDIA SOURCES

(75) Inventors: Min Zhang, Palm Harbor, FL (US); David Howell Wright, Safety Harbor, FL (US); Scott Cooper, Tarpon Springs, FL (US); Regina Dykstra, Palm Harbor, FL (US); Arun Ramaswamy, Tampa, FL (US); Daniel Nelson, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 142 days.

(21) Appl. No.: 11/923,141

(22) Filed: Oct. 24, 2007

(65) Prior Publication Data

US 2008/0127253 A1  May 29, 2008

Related U.S. Application Data

(63) Continuation of application No. PCT/US2007/014317, filed on Jun. 20, 2007.

(60) Provisional application No. 60/815,122, filed on Jun. 20, 2006.

(51) Int. Cl.
*G06K 9/48* (2006.01)
*H04H 60/32* (2008.01)
*H04H 60/33* (2008.01)

(52) U.S. Cl. ................ 382/199; 725/9; 725/19
(58) Field of Classification Search ............ 725/35, 725/9, 19, 141; 382/199
See application file for complete search history.

(56) References Cited

U.S. PATENT DOCUMENTS

| | | | |
|---|---|---|---|
| 4,216,497 A | 8/1980 | Ishman et al. | |
| 4,697,209 A | 9/1987 | Kiewit et al. | |
| 4,885,632 A * | 12/1989 | Mabey et al. | ............ 725/20 |
| 5,294,977 A | 3/1994 | Fisher et al. | |
| 5,450,490 A | 9/1995 | Jensen et al. | |
| 5,495,282 A | 2/1996 | Mostafa et al. | |
| 5,512,933 A | 4/1996 | Wheatley et al. | |
| 5,572,246 A | 11/1996 | Ellis et al. | |
| 5,973,750 A | 10/1999 | Ogawa et al. | |
| 6,169,879 B1 | 1/2001 | Perlman | |
| 6,211,623 B1 | 4/2001 | Wilhelm et al. | |
| 6,266,442 B1 | 7/2001 | Laumeyer et al. | |

(Continued)

FOREIGN PATENT DOCUMENTS

CN  1228671  9/1999

(Continued)

OTHER PUBLICATIONS

International Bureau, International Preliminary Report on Patentability for International application No. PCT/US2007/014317, Dec. 22, 2008, 3 pages.

(Continued)

*Primary Examiner* — Vu Le
*Assistant Examiner* — Soo Jin Park
(74) *Attorney, Agent, or Firm* — Hanley, Flight & Zimmerman, LLC.

(57) ABSTRACT

Methods and apparatus for detecting on-screen media sources are disclosed. An example method includes monitoring a region of interest of a video signal for a first image, comparing the first image to a stored image, and confirming the media device change when the stored image differs from the first image and is associated with a secondary criterion.

25 Claims, 23 Drawing Sheets

U.S. PATENT DOCUMENTS

| | | | |
|---|---|---|---|
| 6,513,161 | B2 | 1/2003 | Wheeler et al. |
| 6,577,346 | B1 | 6/2003 | Perlman |
| 6,633,651 | B1 | 10/2003 | Hirzalla et al. |
| 6,675,174 | B1 | 1/2004 | Bolle et al. |
| 6,675,383 | B1 | 1/2004 | Wheeler et al. |
| 7,064,796 | B2 | 6/2006 | Roy et al. |
| 7,103,222 | B2 | 9/2006 | Peker |
| 7,194,752 | B1 | 3/2007 | Kenyon et al. |
| 7,210,057 | B2 | 4/2007 | Schoch |
| 2003/0043172 | A1 | 3/2003 | Li et al. |
| 2005/0057322 | A1 | 3/2005 | Toncich et al. |
| 2005/0078222 | A1 | 4/2005 | Liu et al. |
| 2006/0085812 | A1 | 4/2006 | Shishegar et al. |
| 2006/0158838 | A1 * | 7/2006 | Kinoshita et al. ............. 361/681 |
| 2007/0124756 | A1 | 5/2007 | Covell et al. |

FOREIGN PATENT DOCUMENTS

| | | |
|---|---|---|
| EP | 0840511 | 3/2005 |
| WO | 2005057322 | 6/2005 |
| WO | WO 2005057322 A2 * | 6/2005 |
| WO | WO 2005065159 A2 * | 7/2005 |
| WO | 2006020560 | 2/2006 |

OTHER PUBLICATIONS

International Searching Authority, International Search Report for International application No. PCT/US07/14317, Sep. 12, 2008, 2 pages.

International Searching Authority, Written Opinion for International application No. PCT/US07/14317, Sep. 12, 2008, 8 pages.

International Searching Authority, International Search Report for international application No. PCT/US04/12272, Mar. 28, 2007, 3 pages.

Nternational Searching Authority, Written Opinion for international application No. PCT/US04/12272, Mar. 28, 2007, 4 pages.

European Patent Office, European Search Report issued for EP application 07845198.6, dated Sep. 15, 2010, 10 pages.

Chinese Patent Office, Office Action issued for CN application No. 200780022899.5, 8 pages, Jun. 3, 2010.

* cited by examiner

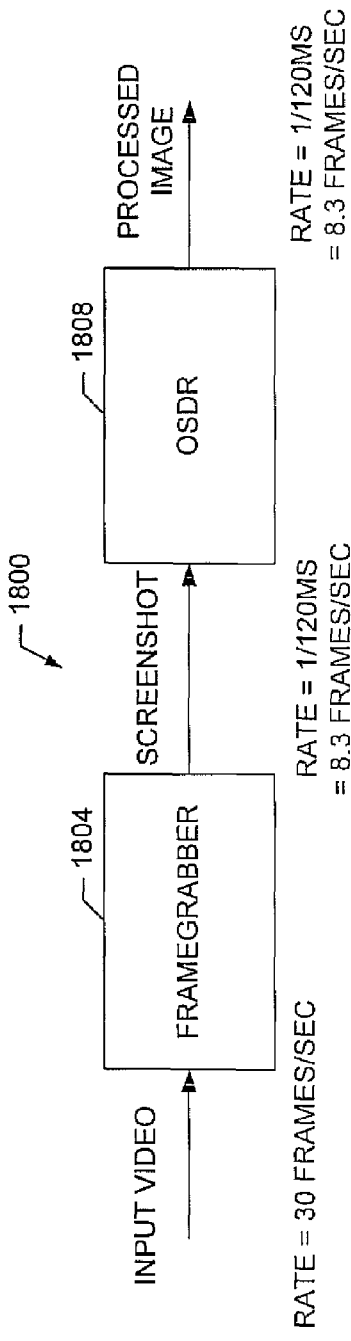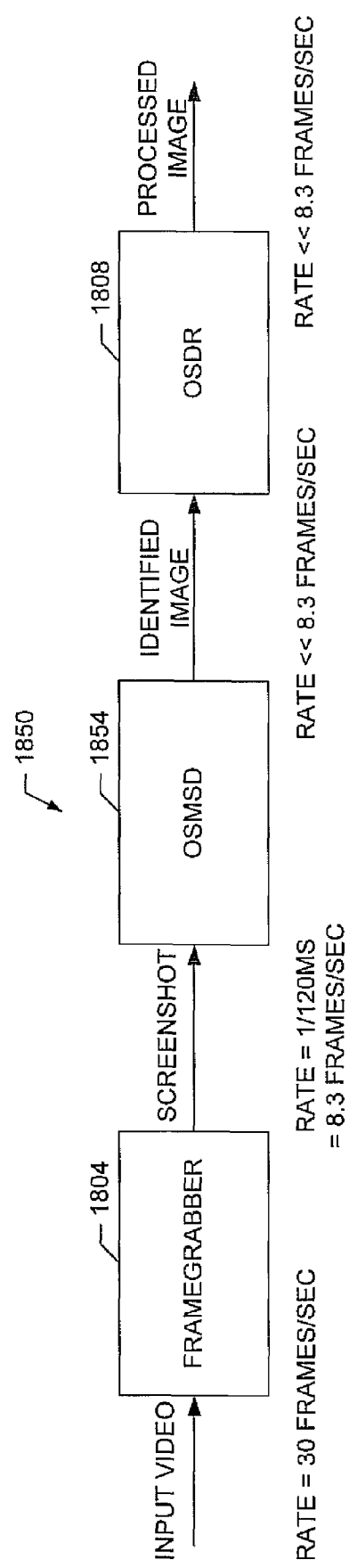

METHODS AND APPARATUS FOR DETECTING ON-SCREEN MEDIA SOURCES

CROSS REFERENCE TO RELATED APPLICATION

This patent arises from a continuation of International Patent Application Serial No. PCT/US2007/014317, filed Jun. 20, 2007, which claims priority from U.S. Provisional Application Ser. No. 60/815,122, filed Jun. 20, 2006, both of which are hereby incorporated by reference in their entirety.

FIELD OF THE DISCLOSURE

This disclosure relates generally to audience measurement systems and, more particularly, to methods and apparatus for detecting on-screen media sources.

BACKGROUND

The demographics of a television viewing audience are typically used by television program producers to improve the marketability of their television programming and determine a best price for advertising during such programming. In addition, accurate television viewing demographics allow advertisers to target commercial content to desired segments of the population.

In order to determine these demographics, an audience measurement company may enlist a plurality of television viewers as panelists. The viewing habits of the enlisted viewers and demographic data about the enlisted viewers are collected and used to determine statistically the demographics of a television viewing audience.

One aspect of audience measurement involves determining the identity of the content being displayed on a television. Conventional audience measurement systems use channel detection techniques to identify the channel to which a television set is tuned (i.e., channel information). This channel information may then be combined with programming information (e.g., a program schedule) to identify the program that was being displayed on the television during the time at which the television was tuned to the detected channel.

In addition, audience members may use a television to consume media from one or more alternate sources, such as a digital versatile/video disk (DVD) player, a video cassette recorder (VCR), game console, personal computer, etc. For example, audience members may use a television for gaming, gambling, shopping, and video on demand, to name a few. While the alternate sources of media may not originate from a broadcaster (e.g., sources such as a DVD player, VCR, video game console, etc.), measurement of the alternate sources may enhance measurement of demographic profiles and viewing habits of the enlisted viewers.

In addition to detecting a channel to which a television is tuned, channel detection systems are used to detect channel change events in which a television stops displaying programming associated with a first channel and begins displaying programming associated with a second channel. Because a channel change event corresponds to a change in the programming being displayed to the programming audience, a channel change event may be used as a trigger to start one or more methods to obtain identification data about the new programming being displayed to the audience.

Additionally, a channel change event and/or a switch to one or more alternate media sources (hereinafter "media change event") often corresponds with a change in the audience membership and, therefore, may also be used to trigger a method for capturing information about the audience. For example, audience measurement systems may include a device, such as a people meter, having a set of input keys, each assigned to represent a single viewer. The people meter may be adapted to capture information about the audience by prompting the audience members to indicate that they are present in the viewing audience by, for example, pressing the appropriate input key disposed on the people meter. Using a media change event as a trigger for people meter prompting allows for the accurate recording of changes in the size and/or membership of the audience that may result from the media change event or that may have caused the media change event.

BRIEF DESCRIPTION OF THE DRAWINGS

FIG. 18A is a block diagram of an example prior-art on-screen display reader (OSDR) system.

FIG. 18B is a block diagram of an example OSDR system that employs an OSMSD front-end filter.

DETAILED DESCRIPTION

Although the following specification discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in any combination of hardware, firmware and/or software.

In addition, while the following disclosure is made with respect to example television systems, it should be understood that the disclosed system is readily applicable to many other types of media systems, including, but not limited to television systems, media recording devices, and/or video game devices. Accordingly, while the following specification describes specific example systems and processes, persons of ordinary skill in the art will readily appreciate that the disclosed examples are not the only way to implement such systems.

Media Environment

Figure 1:
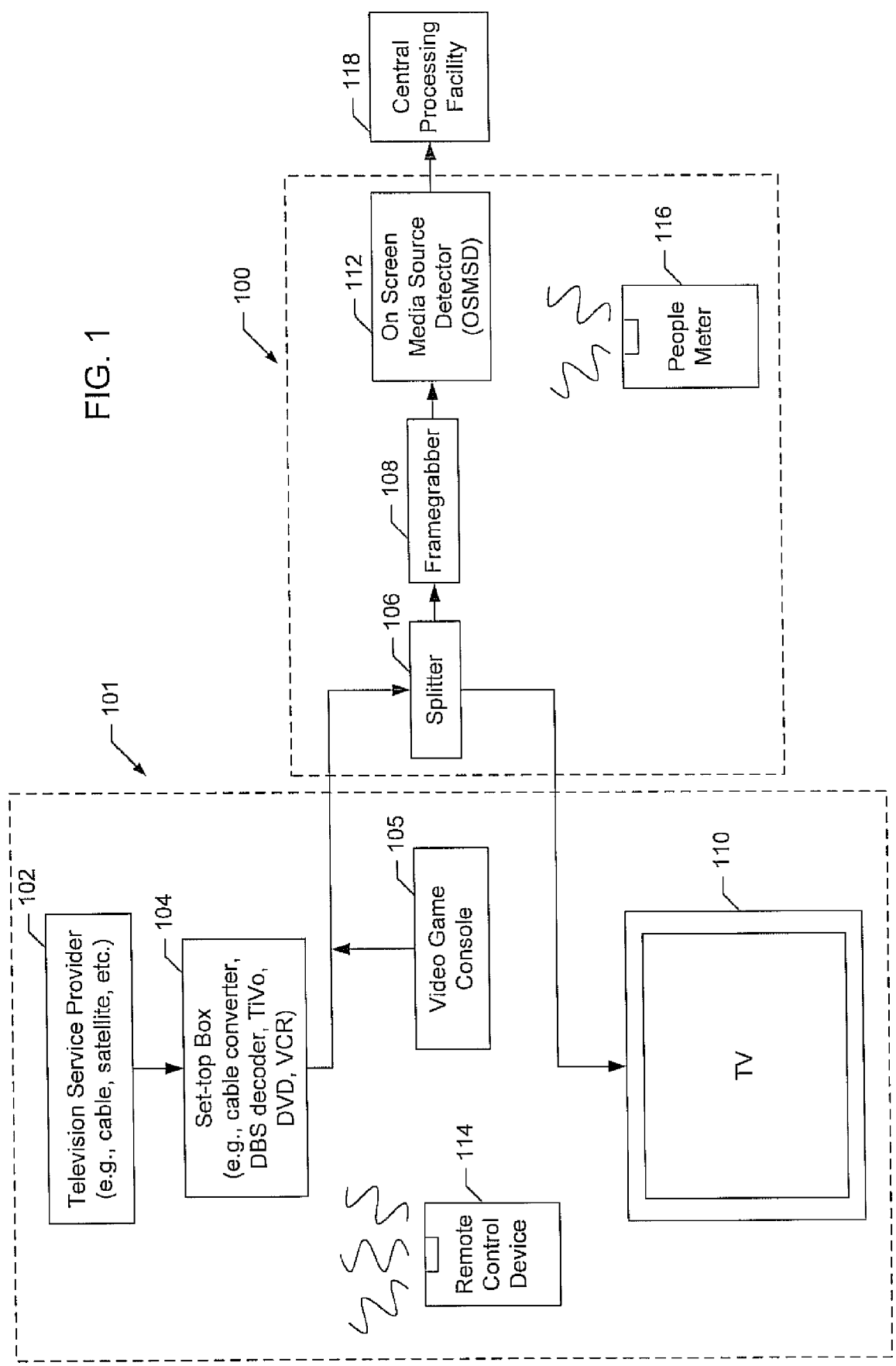
FIG. 1 is a block diagram of an example audience measurement system coupled to an example television system.

A block diagram of an example audience measurement system 100 capable of monitoring a television viewing audience is illustrated in an example environment of use in FIG. 1. Further details of the example audience measurement system 100 are provided in PCT application No. PCT/US2004/012272 filed on Apr. 19, 2004, the specification of which is hereby incorporated herein by reference in its entirety. The example audience measurement system 100 includes a, a signal splitter 106, a framegrabber 108 and an on-screen media source detector (OSMSD) 112. In the illustrated example, the audience measurement system 100 is coupled to an example media center 101 that includes a set-top box 104 to receive a signal from a television service provider 102, a video game console 105, and a television 110 coupled to the set-top box 104. The components of the television system 101 may be connected in any manner including that shown in FIG. 1.

The television 110 may be any type of television or television display device. For example, the television 110 may be a television and/or display device that supports the National Television Standards Committee (NTSC) standard, the Phase Alternating Line (PAL) standard, the Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The television service provider 102 may be any television service provider, such as a cable television service provider, a Telco television service provider, a satellite television service provider and/or a radio frequency (RF) television service provider. The television service provider 102 may provide analog and/or digital television signals to the media center 101, for example, over a coaxial cable or any wireless connection.

The set-top box 104 may be any set-top box, such as a cable television converter, a Telco television converter, a digital over-the-air broadcast converter, a direct broadcast satellite (DBS) decoder, a digital personal video recorder (e.g., TiVo), a digital video disk (DVD) player, a video cassette recorder (VCR), etc. The set-top box 104 receives a plurality of television channels from the television service provider 102. Typically, the set-top box 104 selects one of the plurality of television channels based on a user input and/or outputs a video signal delivered on the selected television channel. In the case of an analog signal, the set-top box 104 tunes to a particular channel to obtain programming delivered on that channel. For a digital signal, the set-top box 104 decodes certain packets of data to obtain the programming delivered on a selected television channel.

The video game console 105 may be any video game system, such as any version of the Xbox® by Microsoft®, the GameCube® and/or the Wii® by Nintendo®, and/or any version of the PlayStation® by Sony®. Without limitation, video games may also be provided to the user via the set-top box 104 (e.g., via the Internet) and displayed on the television 110. Users may access the video game content stored on the set-top box 104 and/or receive video game content from, for example, the television service provider.

Television service providers may also provide other forms of media that are not typically referred to as broadcast content, such as gambling, Internet content, weather information, and/or shopping. The set-top box 104 may also allow users to view a mosaic screen of several channels, a programming guide screen, and/or video-on-demand (VOD) services, each of which, if detected, provides a rich source of viewing habit information to an advertisement measurement company.

The output from the set-top box 104 and/or the video game console 105 is fed to the signal splitter 106 of the audience measurement system 100. The signal splitter 106 may be an analog y-splitter. In the example audience measurement system 100, the signal splitter produces two signals indicative of the output from the set-top box 104. Of course, persons of ordinary skill in the art will readily appreciate that any number of signals may be produced by the signal splitter 106 and/or signals of any resolution (e.g., a high-definition television signal(s)). One of the two signals is fed to the television 110 and the other signal is delivered to the framegrabber 108.

The framegrabber 108 may be implemented using any type of commercially available framegrabber and is used to convert a standard television signal into digital data. For example, the framegrabber 108 may convert NTSC signals to a digital bitmap. An NTSC television image has 525 horizontal lines per frame. These lines are scanned or "grabbed" from left to right, and from top to bottom, where every other line is skipped (i.e., interlaced). As a result of the interlacing, two screen scans are required to complete a full frame. Each half-frame screen scan takes approximately $\frac{1}{60}^{th}$ of a second, and a complete frame is scanned every $\frac{1}{30}^{th}$ of a second. Alternatively or additionally, the framegrabber 108 may convert PAL (Phase Alternation Line) signals and/or SECAM (Sequential Couleur avec Memoire) signals to a digital bitmap. Regardless of the television broadcast standard in which the signal is originally formatted, the resulting bitmap may be any size and may encode any number of shades and/or colors. For example, the framegrabber 108 may capture 320×240 grayscale pixels, 640×480 grayscale pixels, high definition pixels, color images, etc.

The framegrabber 108 periodically (e.g., every 120 ms) captures a "screenshot" corresponding to an image displayed on the television 110 at a specific instant in time and transmits the resulting digital image data to the on-screen media source detector (OSMSD) 112. The OSMSD 112 scans the series of captured images to determine if a channel change event and/or a media source change (both of which are hereinafter referred to as a "media change event") has occurred. The OSMSD 112 is discussed in greater detail below in conjunction with the description of FIGS. 2 and 3.

The example media center 101 may also include a remote control device 114 to transmit control information that may be received by any or all of the set-top box 104, the video game console 105, the television 110, the framegrabber 108 and/or the OSMSD 112. Persons having ordinary skill in the art will recognize that the remote control device 114 may transmit this information using any type(s) of techniques, including, but not limited to, infrared (IR) transmission, radio frequency transmission, wired/cabled connection, and/or the like.

The example audience measurement system 100 may also include a people meter 116 to capture information about the audience. The example people meter 116 may have a set of input keys, each assigned to represent a corresponding viewer, and may prompt the audience members to indicate whether they are present in the viewing audience by pressing the appropriate input key. The people meter 116 may also receive an instruction or set of instructions from the OSMSD 112 to cause the people meter 116 to prompt the audience members. Audience member prompting may include, but is not limited to, presenting one or more graphic overlay images on a screen directed to one or more audience members. For example, the people meter 116 may generate a graphic overlay of text information that asks the audience member to press a button to identify them. Such graphic overlay images may be detected in one or more ROIs so that people meter 116 activity may be determined. Moreover, the OSMSD 112 may receive information from the people meter 116 to modify an operation of the OSMSD 112, for example, to cause the OSMSD 112 to report information to a central processing facility 118. As will be appreciated by persons having ordinary skill in the art, the people meter 116 may receive and/or transmit information using any type(s) of technique(s), including, but not limited to, infrared (IR) transmission, radio frequency transmission, wired/cabled connection, and/or the like.

Figure 2:
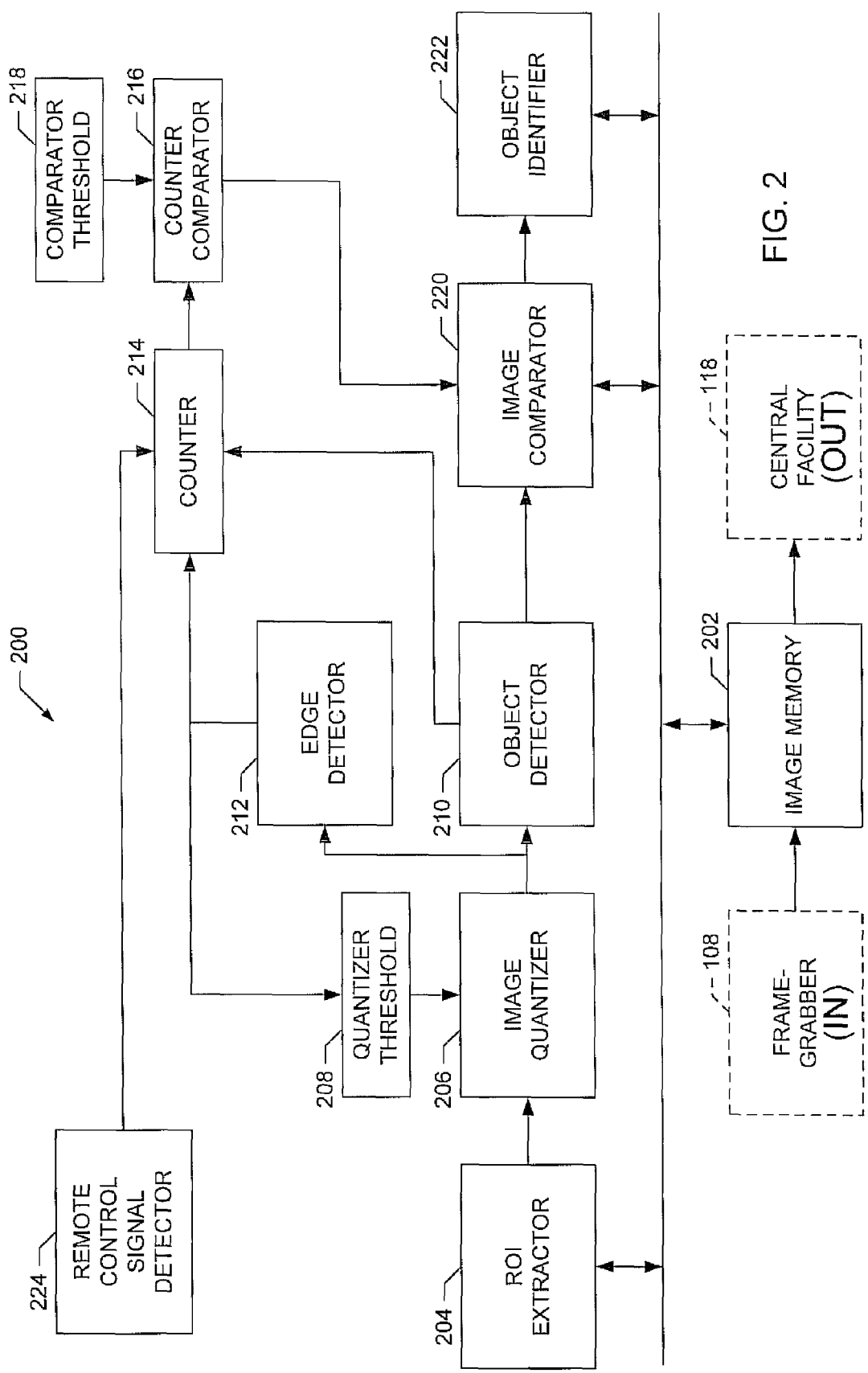
FIG. 2 is a block diagram of a first example on-screen media source detector (OSMSD) for use in the example audience measurement system of FIG. 1.

FIG. 2 is a block diagram of an example OSMSD 200 that may be used to implement the OSMSD 112 of FIG. 1. The example OSMSD 200 receives images and/or image data from, for example, the framegrabber 108 that correspond to a screenshot or portion(s) thereof associated with the television 110. The OSMSD 200 stores the received image data in a memory 202, if certain image conditions are met, as discussed in further detail below. The memory 202 may also be used to store intermediate images and/or one or more extracted region(s) of one or more images that result from processing the image data from the framegrabber 108.

To process the received images, the example OSMSD 200 includes a region of interest (ROI) extractor 204. The ROI extractor 204 reads an image stored in the memory 202 and extracts one or more regions of interest (ROIs) from the image being processed. As discussed in greater detail below, the extracted ROIs may correspond to regions displayed on the television 110 associated with the display of channel numbers during a channel change event. After extracting an ROI from the image being processed, the ROI extractor may store the resulting ROI image back to the memory 202.

Image Management/Processing

Prior to storing the ROI image(s), the ROI extractor 204 may pass the ROI image(s) to an image quantizer 206. By quantizing the ROI image(s) via the image quantizer 206, it may be possible to significantly reduce the amount of memory (i.e., to create a lower memory footprint) and/or processing required by the subsequent blocks/functions in the OSMSD 200. For example, a two-level black-and-white (e.g., binary) ROI image may require as little as one-eighth the memory storage space as a 256-level grayscale ROI image.

Returning to FIG. 2, the image quantizer 206 takes as input a first image having multiple color and/or intensity levels. Then, based on one or more quantizer thresholds 208, the image quantizer 206 converts this first image to a second image having fewer colors (e.g., a color density threshold), alternate intensity levels (e.g., a pixel brightness/luminosity threshold), and/or higher or lower pixel density than the original first image. For example, the image quantizer 206 may be implemented to convert a first image having 256 grayscale levels to a second, black-and-white image having two grayscale levels based on a single threshold 208. In this example, pixels in the first image having grayscale values that are greater than the threshold 208 may be converted to white in the second image. Similarly, pixels in the first image having grayscale values that are less than the threshold 208 may be converted to black in the second image. Additionally, the quantizer threshold 208 may be adjusted (e.g., either manually or automatically based on the results of subsequent processing performed on the image) to improve the clarity of the second image. After conversion, the image quantizer 206 may store the resulting quantized image (i.e., the second image) to the memory 202 for subsequent processing.

To process an image from the memory 202, such as a quantized ROI image from the image quantizer 206, the example OSMSD 200 includes an object detector 210 and an edge detector 212. The object detector 210 may be used to detect one or more objects in the ROT image based on a set of object characteristics stored in the memory 202. For example, the object detector 210 may be configured to detect numeric digits in an ROI image based on a set of characteristics associated with numeric digits, such as height, width, spacing between digits, etc. Additionally, the object detector 210 may be configured to detect symbols, such as channel icons (e.g., the NBC "Peacock"), and/or service icons that may appear on the television 110 when the user enters a broadcast guide mode of the set-top box 104. As discussed in further detail below, media sources may be determined based on images, numbers and/or symbols that appear on the television screen. Media sources may include, but are not limited to, live television viewing, time-shifted viewing, video-on-demand viewing, pay-per-view, mosaics, Internet web surfing, DVD and/or VCR recording and/or playback, the Time Warner® StartOver® Service, and/or interactive applications such as Internet shopping, customer service, guide mode(s), and/or instant messaging. The video game console 105, such as any version of the Xbox by Microsoft, may splash the word "Xbox" in the middle region of the TV screen 110 and splash the word "Microsoft" in the lower center region whenever that game console is powered-on. The edge detector 212 may be used to detect one or more edges (e.g., transitions/differences between intensity levels) in an ROI image. For example, the edge detector 212 may be used to determine whether an ROI image corresponds to a quiet area, i.e., an area having a constant background color/intensity.

In the example OSMSD 200, the object detector 210 may increment a counter 214 each time a desired object or set of objects (e.g., a channel number, symbol, trademark, channel icon) is detected. Conversely, the edge detector 212 may, for example, reset the counter 214 if an edge is detected in an ROI image corresponding to a quiet area. The behavior and use of the object detector 210 and edge detector 212 will become more apparent from the subsequent descriptions of FIGS. 4A through 11C provided below.

Continuing with the description of FIG. 2, the counter 214 may be used to indicate the number of times a desired object or set of objects is detected by the object detector 210 in one or more images stored in memory 202. A counter comparator 216 may be used to compare the value of the counter 214 with a comparator threshold 218 to determine, for example, whether a desired object or set of objects was detected in a sufficient number of images to indicate that a monitored event may have occurred. For example, whether channel numbers were detected in a sufficient number of captured images to indicate that a channel change may have occurred and/or whether the "Xbox" and "Microsoft" images were detected in a sufficient number of captured images to indicate the user just turned on the game console 105. The behavior and use of the counter 214 and the counter comparator 216 will become more apparent from the subsequent descriptions of FIGS. 4A through 11C provided below.

To compare two or more images, the example OSMSD 200 includes an image comparator 220. The image comparator 220 may be used to compare two images, for example an ROI image and a stored reference image/template, to determine if the two images (or contents thereof) are substantially similar or different. For example, in the case of detecting a channel change event, the image comparator 220 may compare an ROI image corresponding to a currently displayed channel number with a reference image/template corresponding to a previously displayed channel number. If the image comparator 220 determines that the two images are substantially the same, then a channel change event has probably not occurred. However, if the two images are substantially different, then a channel change event may have occurred. Activation of the image comparator 220 may occur based on, for example, a trigger signal from the counter comparator 216 indicating that a sufficient number of objects have been detected, and/or from the object detector 210 indicating that a desired object or set of objects has been detected. The behavior and use of the image comparator 220 will become more apparent from the subsequent descriptions of FIGS. 4A through 11C provided below.

Additionally, the example OSMSD 200 may include an object identifier 222 to identify one or more objects that are present in the image (e.g., ROI image) being processed. For example, the object identifier 222 may identify one or more objects in the ROI image based on a set of object characteristics stored in the memory 202. As described above, objects may include, but are not limited to symbols, channel icons, and/or trademarks. In another example, the object identifier 222 may use the results from the image comparator 220 to identify one or more objects in the ROI image. In the latter example, the image comparator 220 may compare the ROI image with a reference image/template corresponding to a known object. If the ROI image and the reference image/template are determined to be substantially the same, then the object identifier 222 may conclude that the ROI image contains the known object. The behavior and use of the object identifier 222 will become more apparent from the subsequent descriptions of FIGS. 4A through 17 provided below.

The example OSMSD 200 may also include a remote control signal detector 224 to detect signals from a remote control device, such as the remote control device 114 of FIG. 1. The OSMSD 200 may use the remote control signal detector 224 to determine whether the remote control device 114 transmitted one or more signals within a window of time during which the image currently being processed was captured by the framegrabber 108. The output of the remote control signal detector 224 may be used to determine whether the image being processed may correspond with a media change event. As described above, a media change event may include, but is not limited to a channel change, activation of a VCR player, a DVD player, and/or a game console. Additionally, the media change event may include use of an electronic program guide, VOD, home shopping, gambling, and/or viewing of multiple channel mosaic screens. For example, if the remote control signal detector 224 determines that no signals were transmitted by the remote control device 114 (indicating that no user input has been applied to the media center 101), then the remote control signal detector 224 may reset the counter 214 to indicate that, for example, any currently detected numeric digits do not correspond with a channel change event. Similarly, despite an on-screen appearance of a trademark, such as the TiVo® logo, absence of a corresponding remote control signal may suggest that the logo appears as a result of an advertisement rather than the user/viewer invoking a TiVo® DVR. The behavior and use of the remote control signal detector 224 will become more apparent from the subsequent descriptions of FIGS. 4A through 17 provided below.

Images identified by the object identifier 222 may be stored in the image memory 202. Furthermore, such identified images may be forwarded to the central processing facility 118, as shown in FIG. 1. The central facility 118 may process the images further to determine whether, for example, a particular image detected in a particular ROI corresponds to a channel change or a particular media device (e.g., set-top box VOD mode, PPV mode, VCR, DVD player, etc.). Additionally, or alternatively, the identified images in the memory 202 may be processed further by the example OSMSD 200 to determine which media devices, and/or the media device mode(s), are being used by the viewer, as discussed in further detail below.

Figure 3:
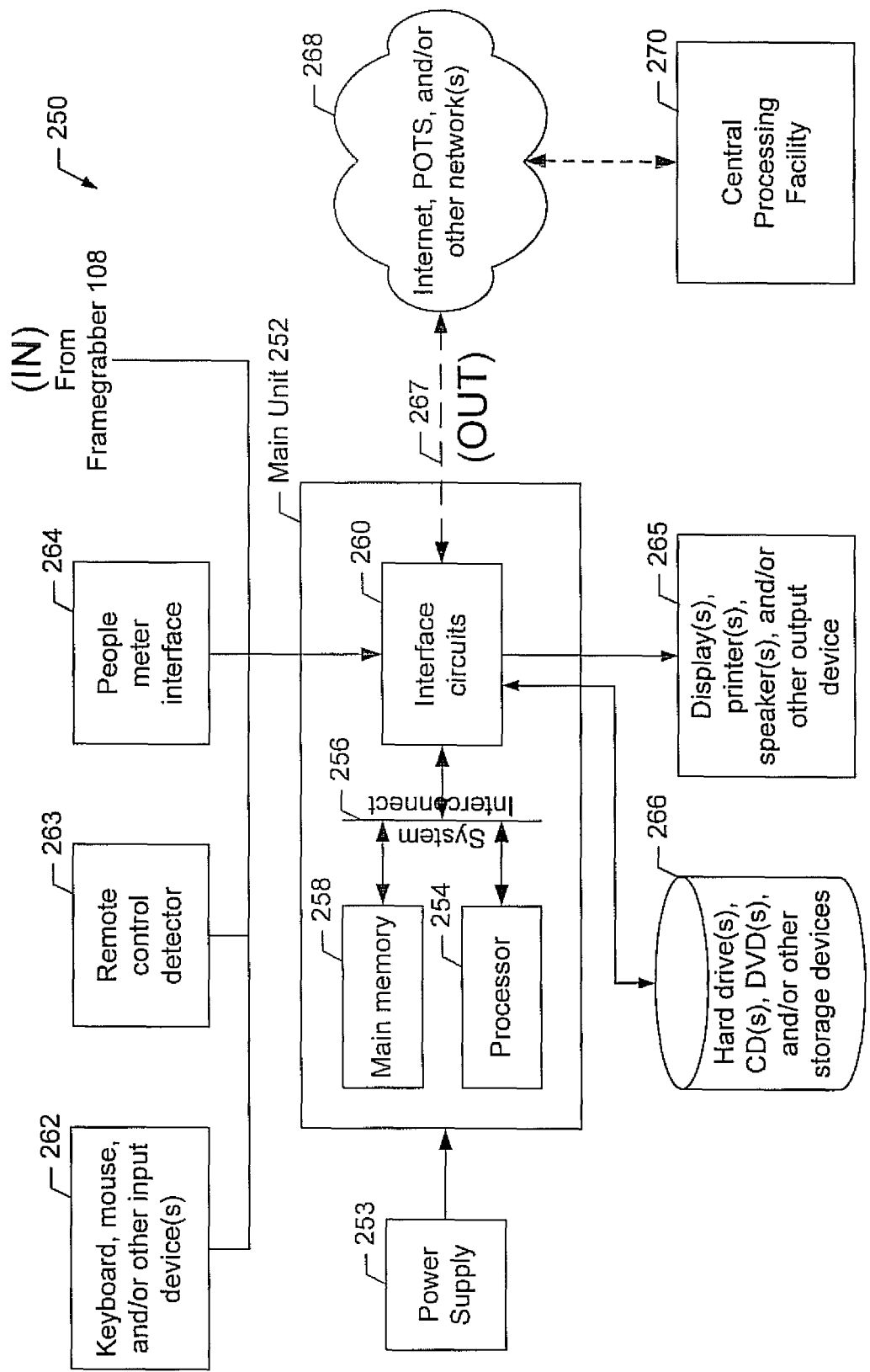
FIG. 3 is a block diagram of a second example OSMSD for use in the example audience measurement system of FIG. 1.

FIG. 3 is a block diagram of an example OSMSD 250 that may be used to implement the OSMSD 112 of FIG. 1, or the example OSMSD 200 of FIG. 2. The example OSMSD 250 may be a personal computer (PC) or any other processor or computing device. Specifically, the example OSMSD 250 includes a main processing unit 252 powered by a power supply 253. The main processing unit 252 may include a processor 254 electrically coupled by a system interconnect 256 to a main memory device 258 and/or one or more interface circuits 260. For example, the system interconnect 256 may be an address/data bus. Of course, persons of ordinary skill in the art will readily appreciate that interconnects other than busses may be used to couple the processor 254 to the main memory device 258. For example, one or more dedicated lines and/or a crossbar may be used to connect the processor 254 to the main memory device 258.

The processor 254 may include any type of central processing unit (CPU), such as a microprocessor from the Intel Pentium® family of microprocessors, the Intel Itanium® family of microprocessors, the Intel Centrino® family of processors, and/or the Intel XScale® family of processors. The processor 254 may include any type(s) of cache memory, such as static random access memory (SRAM). The main memory device 258 may include dynamic random access memory (DRAM), but may also include non-volatile memory. The main memory device 258 may be used to store a software program to be executed by the processor unit 254 in any manner.

The interface circuit(s) 260 may be implemented using any type of interface standard, such as an analog cable interface, a digital cable interface, a satellite signal interface, an Ethernet interface and/or a Universal Serial Bus (USB) interface. One or more input devices 262 may be connected to the interface circuits 260 for entering data and/or commands into the main processing unit 252. For example, an input device 262 may be a keyboard, mouse, touch screen, track pad, track ball, isopoint and/or a voice recognition system. In addition, the interface circuit(s) 260 may handle digital data inputs supplied by the framegrabber 108 of FIG. 1, inputs supplied by a remote control detector 263, and inputs and/or outputs corresponding to a people meter interface 264. The remote control detector 263 detects signals transmitted by the remote control device 114 of FIG. 1. For example, the remote control detector 263 may be designed to detect signaling events (e.g., detect that the remote control device 114 transmitted any signal) or to decode the signals transmitted by the remote control device 114 to determine the control information being transmitted to a receiving device, such as the set-top box 104. Similarly, the people meter interface 264 may be designed to receive signals from and/or transmit signals to the people meter 116 of FIG. 1. For example, the people meter interface 264 may be used to transmit a signal to the people meter 116 if a channel change event is detected. Persons having ordinary skill in the art will recognize that all or a portion of the framegrabber 108, the remote control detector 263 and/or the people meter interface 264 may be incorporated into the OSMSD 250.

One or more displays, printers, speakers and/or other output devices 265 may also be connected to the main processing unit 252 via one or more of the interface circuits 260. For example, an output device may be used to view collected data or for diagnostic purposes. The display 265 may be a cathode ray tube (CRT), a liquid crystal display (LCD) or any other type of display. The display 265 may provide visual indications of data generated during operation of the main processing unit 252. Moreover, the visual display may include prompts for human operator input, calculated values, detected data, etc.

The OSMSD 250 may also include one or more storage devices 266. For example, the OSMSD 250 may include one or more hard drives, a compact disk (CD) drive, a DVD drive and/or other computer media input/output (I/O) devices.

The OSMSD 250 may also exchange data with other devices via a connection 267 to a network 268. The network connection 267 may be any type of network connection, such as an Ethernet connection, digital subscriber line (DSL), telephone line, coaxial cable, etc., and the network 268 may be any type of network, such as the Internet, a telephone network, a cable network, and/or any type of wireless network. For example, the OSMSD 250 may exchange data with a central processing facility 270 via the network 268. The central processing facility 270 may receive data from the OSMSD 250 from which the central processing facility 270 may determine a set of viewing statistics or identify a set of viewing behaviors. In addition, the OSMSD 250 may receive information from the central processing facility 270 to modify an operation of the OSMSD 250, such as the frequency with which the OSMSD 250 provides data to the central processing facility 270.

Figure 4A:
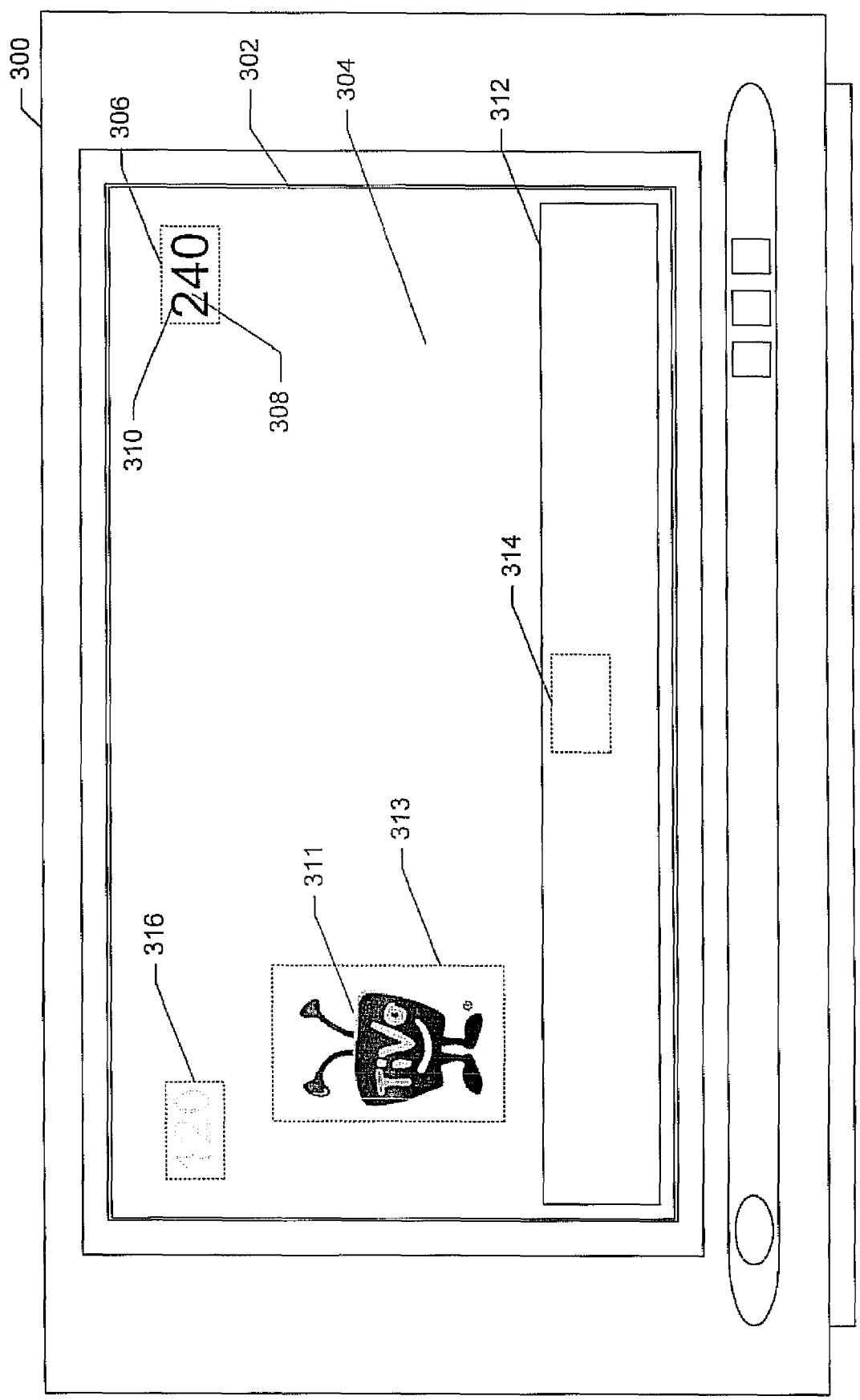
FIG. 4A illustrates example regions of interest of the example television of FIG. 1.

FIG. 4A illustrates example images and type(s) of ROI(s) that may be displayed on an example television 300, such as the example television 110 of FIG. 1. The example television 300 includes a display device 302, such as a CRT, plasma, or an LCD, capable of displaying video/image content within a display area 304. When the channel received by the television 300 is changed (e.g., by the set-top box 104 of FIG. 1), the new channel number is displayed in a region 306 located, for example, near the upper right corner of the display area 304. The region 306 includes a background area 308 that may be, for example, a solid color (e.g., blue), transparent, semi-transparent or opaque. A set of numeric digits 310 that represent the new channel number may be superimposed on the background 308. Hereinafter, region 306 is also referred to as a first region of interest (ROI) 306 and this region may be associated with the display of channel numbers. Similarly, when the viewer invokes the use of a different media device, such as the TiVo® DVR, the TiVo® logo 311 may be displayed in a middle left region 313 of the display area 304.

In some instances, programming content displayed in the first ROI 306 may contain characteristics substantially similar to a channel number (e.g., in the case of a sporting event or game show in which a score or other numeric information may be displayed). To reduce the possibility of erroneously determining that such displayed content is a channel number, secondary queues (indicators) may be employed, such as examining other regions of the display area 304 to confirm the presence or absence of a displayed channel number. For example, simultaneous with the display of a new channel number in the first ROI 306, many example televisions 300 and/or set-top boxes 104 may also display a banner guide in a banner area 312 located, for example, along the bottom of the display area 304. The banner guide may include information such as the name and/or call letters for the current channel, the current time, a description of the programming content being broadcast over the selected channel, the duration of the programming content, etc. Typically, when the banner guide is displayed, the banner area 312 is predominately a solid background color (e.g., blue) on which the displayed information is superimposed. Thus, a known quiet area 314 (i.e., a region typically having a constant display color/intensity when the banner is displayed) may be defined within the banner area 312 and used to indicate whether the banner guide is currently being displayed. Thus, hereinafter, the quiet area 314 is also referred to as a second ROI 314 and this region may be associated with the display of the banner guide.

For many example televisions 300 and/or set-top boxes 104, detecting a channel number in the first ROI 306 along with a banner guide in the banner area 312 (e.g., via detection of a quiet area in the second ROI 314) may be sufficient to indicate that the detection of the channel number was not erroneous. However, in other example televisions 300 and/or set-top boxes 104, the display of a banner guide in the banner area 312 may correspond to events other than a channel change. In such scenarios, other regions of the display area 304 may be examined to confirm the presence of a displayed channel number that corresponds to a channel change event or other events. For example, the user may request that the set-top box 104 provide a banner guide containing information corresponding to the current channel being viewed. This request may also cause the simultaneous display of the current channel number in the first ROI 306. Alternatively, the user may request, for example, that the set-top box 104 produce a banner guide containing information corresponding to channels other than the channel currently being viewed. In this latter case, the user may enter a "banner surfing" mode in which the user may cycle though the informational content (e.g., banner guide information) corresponding to a set of available channels other than the current channel while the programming content of the current channel is still displayed in the display area 304. During banner surfing, the channel number for a banner surfed channel may be displayed in the first ROI 306 (rather than either the current channel or the new channel after a channel change event). Simultaneously, the current channel number may be displayed in a region 316 located, for example, near the upper left corner of the display area 304. Accordingly, hereinafter, the region 316 is also referred to as a third ROI 316 and this region may be associated with the display of the current channel number during one or more operational modes of the banner guide. Thus, the displayed contents in the third ROI 316 may be examined, for example, to confirm that a detected channel number in the first ROI 306 corresponds to a channel change event or to determine that a channel number displayed in the first ROI 306 corresponds to a banner surfing event.

Figure 4B:
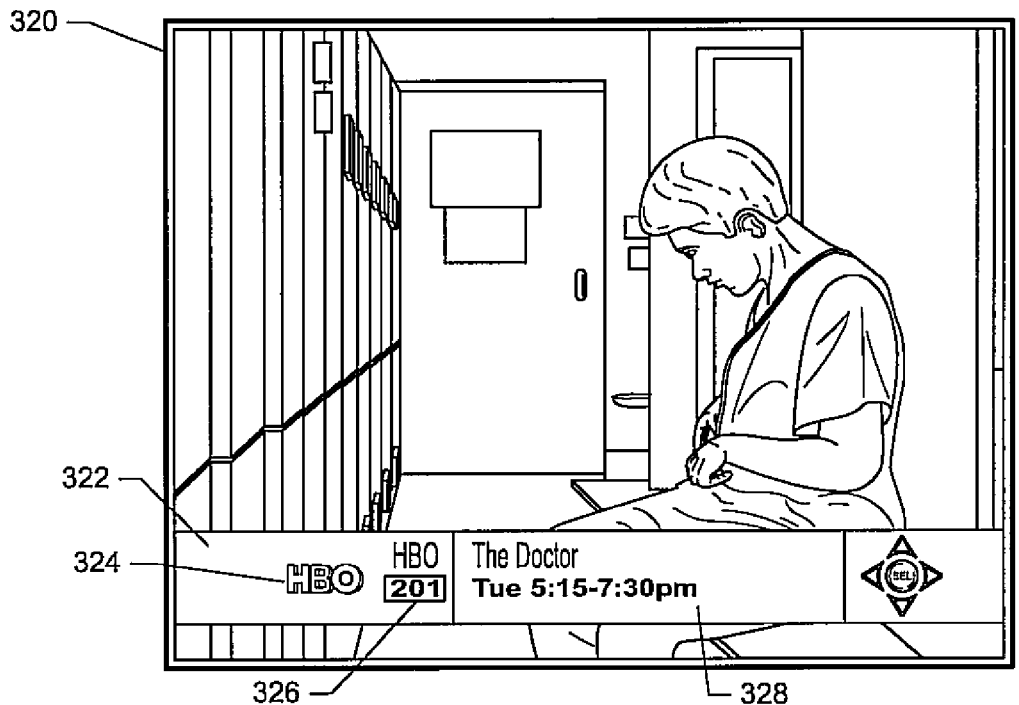
FIGS. 4B-4E depict a series of screens that may be displayed on the television of FIGS. 1 and 4A illustrating example television viewing, banner surfing, video-on-demand, and a television guide feature.
Figure 4C:
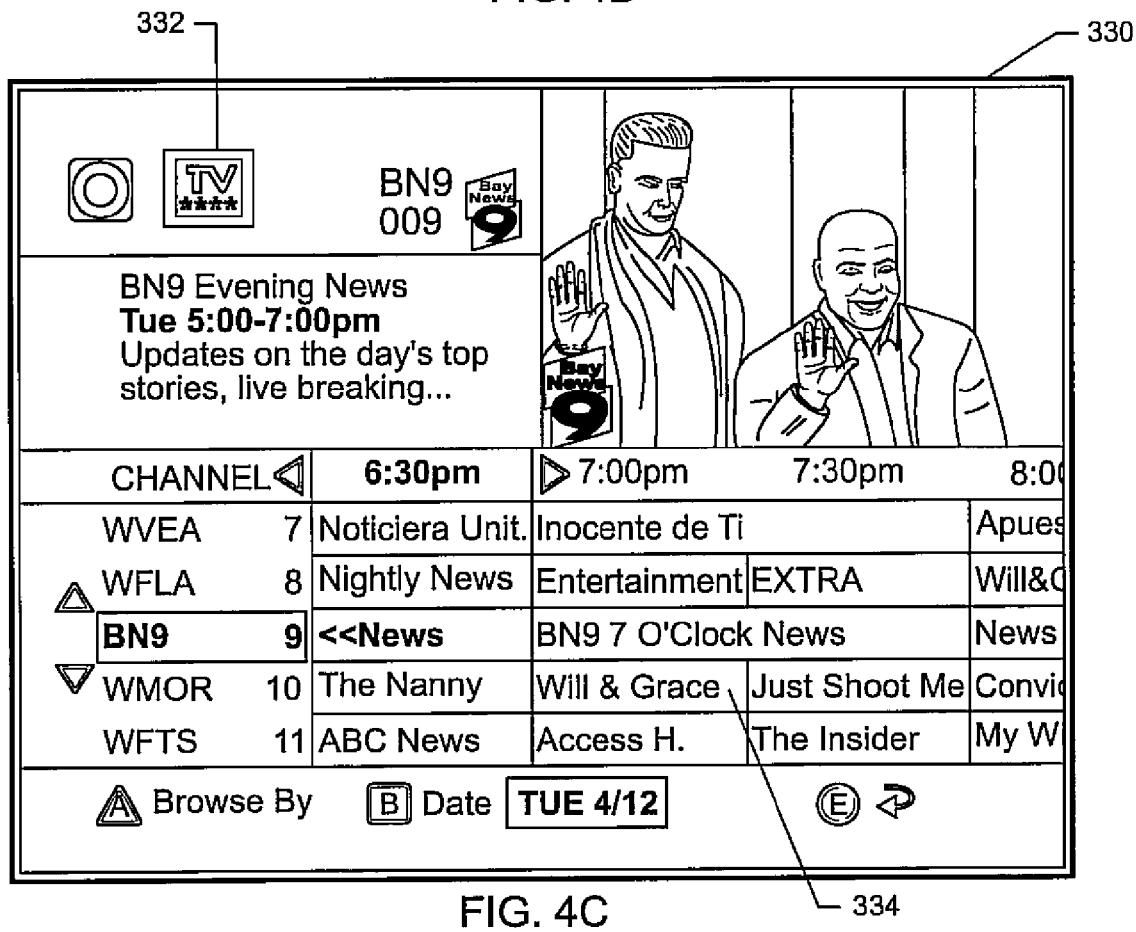
Figure 4D:
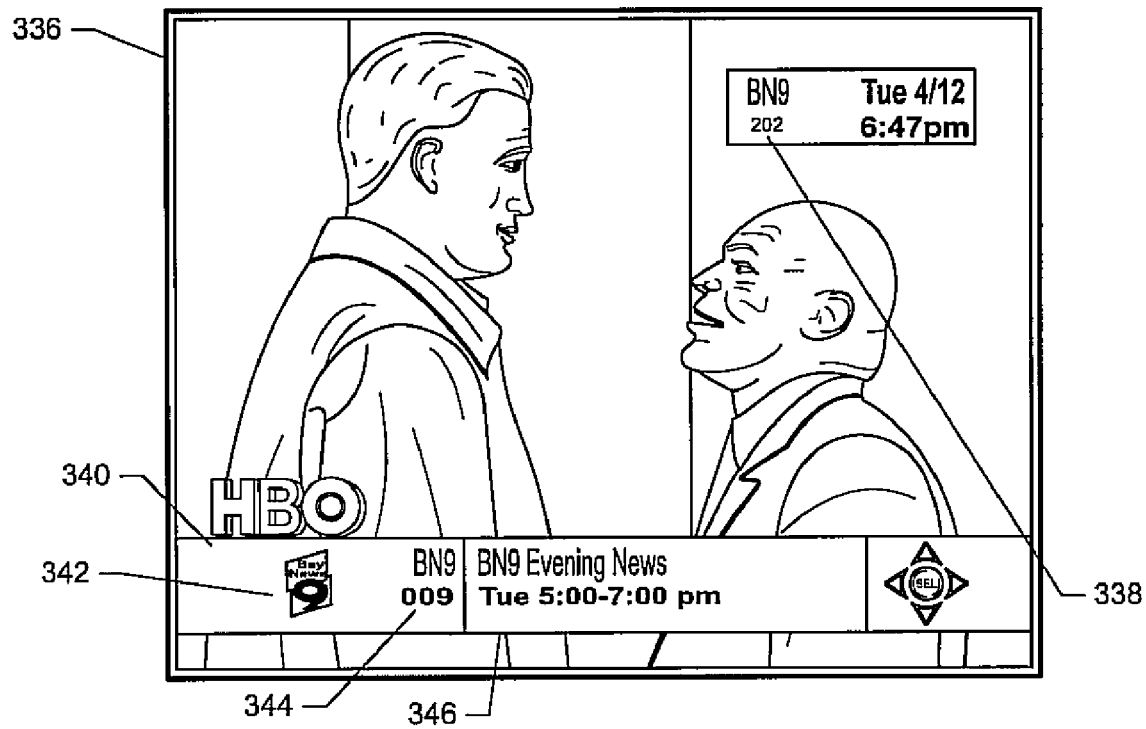
Figure 4E:
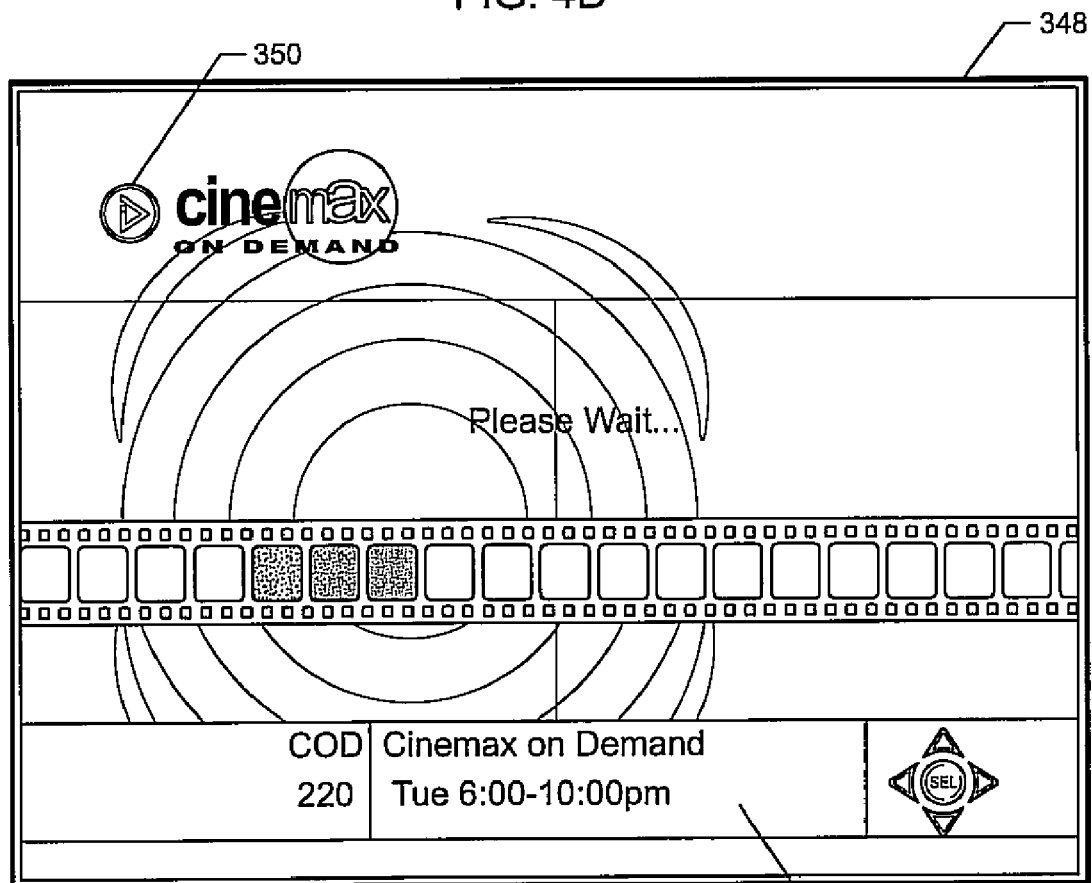

FIG. 4B includes an example screen 320 that illustrates banner surfing. Different set-top boxes may employ different ROIs to display a currently viewed channel 322 in a viewed channel ROI 324 and a banner channel 326 in a banner channel ROI 328 with associated descriptive information 328. FIGS. 4B-4E also illustrate four example viewing modes a user may invoke with a set-top box 104. As shown in FIG. 4B, a television ("TV") viewing mode 320 provides the viewer with a banner 322 that includes a network icon "HBO" 324, a set of numeric digits 326 to represent the currently viewed channel, and descriptive information 328 about the currently viewed channel 326. FIG. 4C illustrates a programming guide mode 330 that includes a "TV Guide" icon 332, and type(s) of programming information 334. FIG. 4D illustrates an example screenshot of a banner surfing mode 336, which includes a set of numeric digits 338 to represent the currently viewed channel. The banner surfing mode 336 also includes a banner 340, a network icon 342, a channel number 344, and descriptive information 346, each of which relates to programming content other than that which is currently being viewed. FIG. 4E illustrates a video-on-demand (VOD) mode 348 that includes an example banner 349 and an example VOD icon 350.

Each of the TV viewing mode 320, guide mode 330, banner surfing mode 336, and/or VOD mode 348 includes unique ROIs, icons, symbols, and/or combinations thereof. For example, while both the TV viewing mode 320 and the banner surfing mode 336 include banners, (322 and 340, respectively) the simultaneous presence of the set of numeric digits 338 indicate that the user is banner surfing rather than merely watching TV. Each of the viewing modes may be identified by training the OSMSD 112 to monitor specific ROIs and identify the presence and/or absence of one or more icons, symbols, and/or digits. As a result, viewer behavior may be determined by video and/or remote control usage, including a determination of one or more media devices being used by the viewer (e.g., DVD player, VCR, video game console, TiVo®, etc.).

Persons having ordinary skill in the art will appreciate that the regions of interest (e.g., ROIs 306, 314 and/or 316) described above may be tailored to the properties of a specific set-top box 104 and/or television 110 employed in the television system 101. For example, another example set-top box 104 may cause the display of channel numbers in a first ROI 306 located in the upper left corner of the display area 304 (rather than the upper right corner as described for the example television 300 of FIG. 4A). Alternatively or additionally, the banner area 312 may be located along the top of the display area 304 (rather than along the bottom as described for the example television 300). Also, during banner surfing, some set-top boxes 104 and/or televisions 110 may display the banner surfed channel numbers in the banner area 312 rather than in a separate location in the display area 304 (as compared to the banner surf channel numbers being displayed in the first ROI 306 for the example television 300). Typically, the number and characteristics of the one or more regions of interest are calibrated during the initial configuration of the audience measurement system 100. The corresponding calibration settings may be updated, for example, when a new component is installed in the television system 101, such as a new set-top box 104. The calibration settings may also be updated by any or all of the central processing facility 222, OSMSD 112 and/or framegrabber 108 to improve the reliability of detecting the channel change event.

Figure 5:
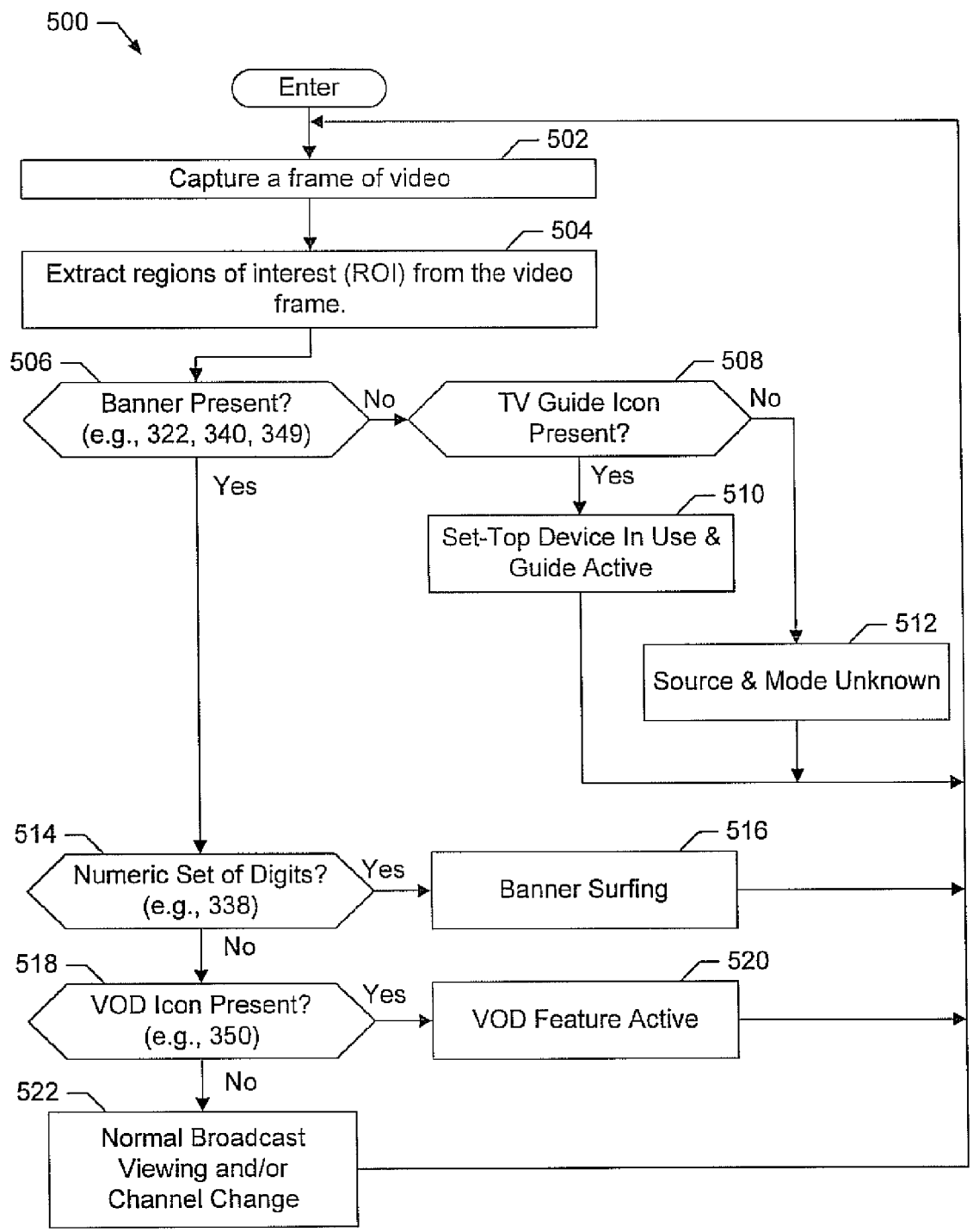
FIG. 5 illustrates a flow diagram of an example process to determine viewer activity.

A flowchart illustrating an example process 500 to determine viewer activity is shown in FIG. 5. The process 500 may be performed by an OSMSD, such as the example OSMSD 112 or 200, and may be embodied in one or more software programs, which are stored in one or more memories and executed by one or more processors in any manner. However, some or all of the blocks of the process 500 may be performed manually and/or by one or more hardware devices.

Generally speaking, the example process 500 scans one or more ROIs (e.g., ROIs 306, 314 and 316 of FIG. 4A, or ROIs 322, 324, 326, 332, and 338 of FIG. 4B) associated with a predetermined number of consecutively captured video frames to determine whether the user is viewing broadcast media 320, viewing a guide utility 330, banner surfing 336, and/or consuming VOD services 348. In particular, when any one of the aforementioned viewing modes is invoked by a user, a specific combination of ROIs will contain numbers, symbols, and/or icons.

The example process 500 begins at block 502 where the framegrabber 108 of FIG. 1 captures a screenshot corresponding to a frame of a video signal being delivered from, for example, the set-top box 104 to the TV 110. The captured screenshot may correspond to an entire frame of video or instead be only a portion of a frame. The OSMSD 112 extracts at least one ROI from the captured screenshot (block 504). For example, the OSMSD 112 may extract and store to memory an ROI associated with a banner, such as regions 322, 340, and 349, and/or extract an ROI associated with the Guide feature 332. As discussed in further detail below, numbers, symbols, and/or icons extracted from one or more ROIs may be modified to aid detection efforts and/or conserve memory.

If characteristics of an on-screen banner (e.g., 322, 340, 348) are not detected by the OSMSD 112, then the OSMSD 112 checks for the presence of the "TV Guide" symbol 332 (block 508). If the Guide symbol 332 is detected, then the present media device being used is the set-top box 104 and the present mode is the Guide mode 330 (block 510). To reduce the possibility of mischaracterizing the media device being used and/or viewer activities, additional ROIs may be evaluated by the OSMSD 112. For example, if a TV advertisement is being aired that includes the TV Guide symbol 332, and such symbol happens to reside in the same screen location as shown in FIG. 4C, then the Guide mode 330 may be mistakenly detected when, instead, the user is merely watching broadcast TV. Such concerns may be avoided by analyzing one or more additional ROIs for one or more characteristics indicative of, for example, the Guide feature 330. In particular, the OSMSD 112 may check for the programming information 334 in a grid format, as shown in FIG. 4B, to verify that a Guide mode is active. If no banner is present (block 506) and no TV Guide symbol appears in its predetermined ROI (block 508), then the current media source and/or viewing mode may not be known (block 512). Additional video frame captures may continue in search of viewer mode and/or media devices being used (block 502).

If a banner is present on-screen (block 506), then in the illustrated example, any one of three example modes may be active. In particular, a TV viewing mode 320, a banner surfing mode 336, or a VOD mode 348 may be active when a banner (322, 340, 349) is present. The OSMSD 112 may determine whether a numeric set of digits 338 is present in the upper right hand corner of the screen (block 514), as shown in FIG. 4B, and, if so, determine that the viewer is banner surfing (block 516). While different set-top boxes may exhibit banner surfing in different ways, the current channel being viewed typically remains on-screen while the user reviews alternate channel numbers 344 and corresponding program information 346. However, if the screen does not include a numeric set of digits 338 in the upper right hand corner (block 514), then the OSMSD 112 examines the captured screen for the presence of a VOD symbol (block 518), such as the VOD symbol 350 shown in FIG. 4B. In the illustrated example, the presence of the VOD symbol 350, the banner 349, and an absence of a set of numeric digits 338 in the upper right hand corner of the TV screen indicate that the viewer has invoked VOD (block 520). On the other hand, if the VOD symbol 350 is not present, the viewer may be watching broadcast programming, or possibly pressed an information button to obtain the banner screen 322 containing programming information 328 (block 522). The process 500 may repeat (block 502) to continue viewer monitoring and/or media device usage.

The use of the framegrabber 108 and the OSMSD 112 may detect one or more viewer activities and corresponding media sources including, but not limited to, viewer initiated channel changes with the set-top box 104, banner surfing, VOD, TV guide services, video game play via the set-top box 104 and/or a separate video game console, and/or mosaic viewing.

OSMSD Detection of Channel Changes

Based on the foregoing descriptions of FIGS. 1 through 4E, the use of the framegrabber 108 and OSMSD 112 to detect a television channel change event by monitoring on-screen activity for one or more channel change indicators is now discussed. Specifically, the framegrabber 108, which receives substantially the same electrical signals as the television 110, periodically captures "screenshots" of the images displayed on the television 110. A screenshot is a digital representation of an image displayed on the television 110 at a specific instant in time. These screenshots include one or more regions of interest, such as the ROIs 306, 314 and 316 of FIG. 4A, where on-screen activity (or lack thereof) may be used to determine if the channel of the television has been changed. As described previously, many televisions 110, possibly under the control of a set-top box 104, are adapted to temporarily display a channel number in the upper right corner (or some other predefined region) of the television display area 304 when the channel is changed (e.g., ROI 306). Thus, in this example, ROI 306 may be used as a first ROI and may be scanned horizontally and vertically and converted to a black-and-white image. The resulting image data may then be examined to determine whether one or more numeric digits indicative of a channel number are displayed in this region. To determine whether content displayed in ROI 306 represents a channel number and, therefore, may indicate that a channel change has occurred, one or more characteristics of the displayed content are detected and measured, including, for example, the height, width, and centering of the content. These characteristics are pre-programmed into the television 110 or set-top box 104 during manufacture and are used by the television 110 or set-top box 104 to control the manner in which channel numbers are displayed on-screen. Thus, the display of content having the preprogrammed characteristics of channel numbers in the first ROI 306 may be used to indicate the occurrence of a possible channel change and to trigger, for example, a prompt on the people meter 116.

Depending on the operation of the television 110 and/or set-top box 104, the display of channel numbers in the first ROI 306 may not be sufficient evidence that a channel change has occurred. For example, a display of numbers detected in the first ROI 306 may be associated with the programming content being displayed and have no connection to a channel change. In this case, any similarity the displayed numbers have to those associated with an actual channel number display may be coincidental. For example, a television ad may display a contact telephone number on-screen that resides in the same ROI that is used to display the tuned channel. In another example, different televisions 110 and/or set-top boxes 104 enable an activity referred to as "banner surfing" that allows a viewer to continue viewing a first channel while causing the television to display a banner guide (e.g., in the banner area 312 of FIG. 4A) containing information about programming available on one or more other channels at the same or at other times. The information contained in the banner guide may include channel number information and/or program identification information (e.g., a program title). The term "surfing" is often used to describe this behavior because many television systems 101 allow the viewer to rapidly cycle through information associated with each of a plurality of channels by repeatedly pressing a designated button on the remote control 114 or by holding the designated button in a depressed position for a predefined, minimum period of time. Moreover, some televisions 110 and/or set-top boxes 104 that enable banner surfing will also display the number of the channel being banner surfed (the channel for which the banner guide is providing information) in the same on-screen location where channel numbers are displayed in response to a channel change (e.g., ROI 306). Additionally, the banner surfed channel numbers may be displayed using the same stored characteristics as are used to display channel numbers associated with an actual channel change. Thus, the detection of numeric digits in the first ROI 306 may not correspond to a channel change but may instead represent a channel for which information is being obtained via banner surfing.

A false positive channel change determination is defined, hereinafter, to be the detection of numeric digits in the first ROI 306 that do not correspond to an actual channel change event and that are falsely identified as being indicative of a channel change. To reduce the likelihood of a false positive channel change determination, additional regions of interest may be examined and/or screen blanking may be monitored. For example, a second ROI, such as a background area or a quiet area (e.g., ROI 314 of FIG. 2), may be examined. The quiet area ROI 314 may constitute a portion of the television screen in which a solid color is displayed when a channel number is being displayed in the first ROI 306. Therefore, if the quiet area ROI 314 is not displaying a solid background when a channel change has been detected, then the detected channel change may be a false positive. However, as mentioned above, some televisions 110 and/or set-top boxes 104 cause a channel number to be displayed in the first ROI 306 when the viewer is banner surfing and, thus, when the quiet area ROI 314 is displaying a solid background. The channel number being displayed in the first ROI 306 during such banner surfing does not indicate the channel number of the channel currently being viewed nor does it indicate that a channel change has occurred. Instead, the displayed channel number represents a channel other than the channel currently being viewed and about which the viewer seeks information.

To ensure that this banner surfing number is not mistaken for a channel number indicative of an actual channel change event, a third ROI (e.g., ROI 316 of FIG. 4A) may also be examined. This third region of interest may be located, for example, in the upper left corner of the television screen because many televisions 110 and/or set-top boxes 104 are configured to cause the actual channel number to be displayed in the upper left corner of the display area 304 (e.g., ROI 316) when a banner surfing channel number is being displayed in the upper right corner of the display area 304 (e.g., ROI 306). Therefore, if a channel number is detected in both the first ROI 306 and third ROI 316, then the channel number detected in the first ROI 306 is not indicative of a channel change event.

Once a channel number is detected in the first ROI 306, it may be compared to a channel number that was displayed prior to the currently displayed channel number. If the channel number previously displayed is identical to the channel number currently being displayed, then a channel change has not occurred. Instead, the number of the channel currently being viewed is being displayed, most likely, for informational purposes. In contrast, if the channel number previously displayed is different from the channel number currently being displayed, then a channel change may have occurred.

Figure 6A:
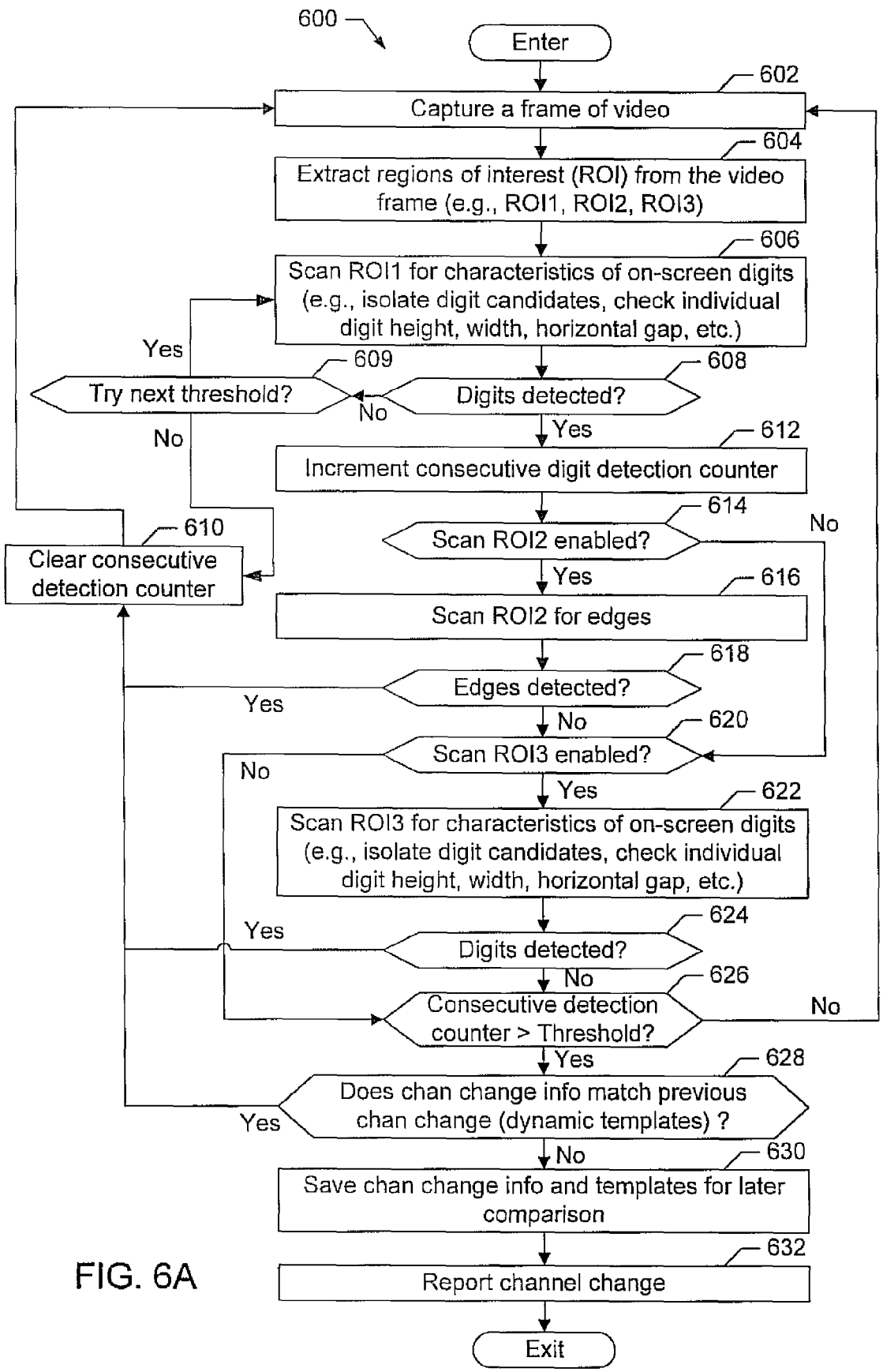
FIG. 6A illustrates a flow diagram of a first example process to determine whether a channel change event has occurred.

A flowchart illustrating an example process 600 to determine whether a channel change event has occurred is provided in FIG. 6A. The process 600 may be performed by an OSMSD, such as the example OSMSDs 112 or 200, and may be embodied in one or more software programs which are stored in one or more memories and executed by one or more processors in any manner. However, some or all of the blocks of the process 600 may be performed manually and/or by one or more hardware devices. Although the process 600 is described with reference to the flowchart illustrated in FIG. 6A, persons of ordinary skill in the art will readily appreciate that many other methods of performing the process 600 may be used. For example, the order of many of the blocks may be altered, the operation of one or more blocks may be changed, the operation of one or more of the blocks may be combined, and/or one or more of the blocks may be eliminated.

In general, the example process 600 scans one or more ROIs (e.g., ROIs 306, 314 and 316 of FIG. 4A) associated with a predetermined number of consecutively captured video frames to determine if numeric digits indicative of a channel change are being displayed in each of the consecutively captured frames. In the illustrated example, the predetermined number of frames corresponds to the number of consecutive frames in which a channel number is displayed when a channel change has occurred, but other numbers of frames may be employed. Specifically, when a channel change occurs, the television 110 and/or set-top box 104 typically causes the newly selected channel number to be displayed for a predefined length of time that may be sufficient, for example, to allow the viewer to see and recognize the channel number. The predefined length of time will dictate the number of consecutive frames during which the channel number will be displayed and may vary depending on the settings of the television 110 and/or set-top box 104 being monitored. If such numeric digits are detected in a first ROI (e.g., ROI 306), one or more other regions of interest associated with the same video frame may also be examined to reduce the likelihood that the detected numeric digits will result in a false positive determination.

The example process 600 begins at block 602 where the framegrabber 108 of FIG. 1 captures a screenshot corresponding to a frame of a video signal being delivered from, for example, the set-top box 104 to the television 110. The captured screenshot may correspond to an entire frame of video or may instead be only a portion of a frame. Next, the OSMSD 112 extracts one or more ROIs from the captured screenshot (block 604). For example, the OSMSD 112 may extract three separate ROIs (e.g., ROIs 306, 314 and 316 of FIG. 4A) for storage in memory. During the extraction process, the ROIs are converted to gray-scale images using any type(s) of method(s). The resulting gray-scale images may be further converted to sets of digital data that represents gray-scale images in any type of format. Control then proceeds to block 606 where the OSMSD 112 scans a first ROI 306 both horizontally and vertically for the presence of numeric digits (block 606). Specifically, a horizontal scan of the first ROI 306 is performed by reading the corresponding screenshot data, pixel by pixel, from left to right (or vice versa) and a vertical scan is performed by reading the frame data, pixel by pixel, from top to bottom (or vice versa). During the scanning process, the gray-scale image corresponding to ROI 306 is converted to a black-and-white (e.g., binary) image based on one or more quantization thresholds. This conversion process is discussed in greater detail below in conjunction with FIGS. 7 and 8.

The black-and-white image data is examined for characteristics indicative of the presence of one or more numeric digits. Specifically, and referring also to FIG. 9, each numeric digit may be divided into one or more components. By detecting one or more of these components and measuring/recording one or more characteristics of these components, the OSMSD 112 may detect the presence of one or more numeric digits that are formed of such components. For example, depending on one or more of the parameters/characteristics stored in the television 110 and/or set-top box 104, the channel numbers and components thereof that are displayed in the first ROI 306 will have a predefined width/height, or range of widths/heights, such that any displayed content having a width/height not equal to the predefined width/height or having a width/height outside of the predefined range will not qualify as a potential component and, therefore, may be discarded. Similarly, Arabic numeric digits (i.e., 1, 2, 3, 4, etc.) do not have a horizontal gap, and, thus, any content having such a gap will not qualify as a potential numeral and therefore may be dismissed. A horizontal gap is defined to be a region comprising a horizontally disposed row of pixels that extends the full width of a numeric digit and that is disposed between the outermost vertical edges of the numeric digit (i.e., the top and bottom of the numeric digit). The values of the pixels in a horizontal gap are substantially equivalent to each other and substantially different from the pixel values corresponding to a displayed numeric digit.

Likewise, the manner in which content is centered within the first ROI 306 may be compared to a stored character centering characteristic. If the content is centered in accordance with the stored character centering characteristic, then the content may represent a numeric digit. After either of the horizontal scan and the vertical scan, or both, have been performed and the resulting map of digital data has been examined, the OSCCD 112 uses the results of the examination to either increment a digit detection counter (in the event a numeric digit has been detected) or to clear the digit detection counter (in the event a numeric digit has not been detected).

As will be appreciated by persons having ordinary skill in the art, the number of characteristics that must be detected before the displayed content is validated as a numeric digit (thereby causing the digit detection counter to be incremented) may vary depending on the certainty required by the system performing the process 600. For example, as the detection of characteristics consistent with the display of a numeric digit increases, certainty that the displayed content actually is a numeric digit also increases. Processing complexity may also increase as the examination of the region of interest becomes more comprehensive. For example, the process 600 may require that the map of digital data contains content that conforms to the stored height, width, spacing and/or character-centering characteristics.

As will be appreciated by persons having ordinary skill in the art, the first ROI 306, and for that matter any ROI, may be scanned/examined for the presence of numeric digits using any type(s) of method(s) that enable the detection of one or more of the digit components and/or any characteristics of the digit components: Such method(s) may include technique(s) that examine the position/locations of any of the edges of the components, the height of any of the components, the width of any of the components, the number and/or width of any vertical gaps separating any of the components (to determine whether the gaps are equal to or within an expected, predefined distance between two numeric digits representing a multi-digit number), the absence of any horizontal gaps, etc. Persons of ordinary skill in the art will readily appreciate that other characteristics/parameters specific to the set-top box 104 and/or television 110 may be used to determine if a numeric digit displayed in the channel number display area (e.g., ROI 306) qualifies as a channel number.

In the example of FIG. 6A, if the OSMSD 112 determines that the content displayed in the first ROI 306 is not likely a numeric digit because the characteristics of the detected components, if any, are not consistent with the stored characteristics (block 608), then the OSMSD 112 checks if another quantization threshold may be used to quantize the ROI image to a black-and-white format. As discussed below in greater detail, a different quantization threshold may result in a black-and-white ROI image with better edge clarity. If another threshold is available (block 609), control then returns to block 606 where the OSMSD 112 re-converts the gray-scale ROI image to a black-and-white image and re-scans the image for the presence of numeric digits. Control then proceeds as described above. However, if another threshold is not available (block 609), the OSMSD 112 then clears the digit detection counter (block 610) and control returns to block 602. If, instead, the OSMSD 112 determines that the characteristics of the displayed components are consistent with the stored characteristics of the numeric digits used to display a channel number (block 608), then the OSMSD 112 may increment the consecutive detection counter (block 612) to indicate that a channel number is being displayed in the currently captured frame.

In the event that a numeric digit was detected thereby causing the digit detection counter to be incremented, the OSMSD 112 determines whether scanning of a second ROI, such as the background area 314 of FIG. 4A, is enabled (block 614). For example, the OSMSD 112 may read a location in memory 208 to determine if scanning of the second ROI 314 is enabled. In the example of FIG. 6A, control reaches block 614 if, at block 608, a numeric digit was detected in the first ROI 306. Block 614 may be used to initiate a procedure to detect false positives by examining the second ROI 314 for the display of information that will either validate or invalidate the digits detected at block 608. When a numeric digit representing a channel number is actually displayed in the first ROI 306, the second ROI 316 may be defined to include a portion of the banner area 312 in which a banner guide is programmed to appear in response to a user prompt entered via, for example, the remote control 114. The banner guide, as described above, may be configured to provide information about the programming available on the channel currently being displayed or available on other channels. To indicate whether the banner guide is present, for example, as a result of a channel change event, the second ROI 316 may be defined to be a region within the banner area 312 that would be quiet (i.e., a solid background color) if the banner guide is active.

Therefore, because in the illustrated example, the second ROI 314 will contain only a solid background when the first ROI 306 contains a channel number, the second ROI 314 is scanned for edges (block 616), the presence of which would indicate that the second ROI 314 is not filled solely with a background color and, thus, that the numeric digit detected in the first ROI 306 represents a false positive determination. Similar to the processing of the first ROI 306, during the scanning process, the gray-scale image corresponding to the second ROI 314 is converted to a black-and-white image based on one or more quantization thresholds. If edges are not present in the second ROI 314 (block 618), thereby indicating that the background area is quiet (as would be expected if a channel number were being displayed), then the OSMSD 112 may confirm/validate the determination made at block 608 (i.e., that a channel number is being displayed). Thus, if at block 618 an edge is detected, control then proceeds to block 610 and blocks subsequent thereto (as described above) at which the digit detection counter is cleared to indicate that a channel number has not been detected in the current frame and another video frame is captured for examination (block 602). As will be appreciated by persons having ordinary skill in the art, there are many ways to perform edge detection any of which may be used by the OSMSD 112 to determine whether the second ROI 314 contains edges. Moreover, similar to the processing of the first ROI 306, in the event that no edges are detected, and if multiple quantization thresholds are available, the OSMSD 112 may attempt to re-convert and/or re-scan the black-and-white image corresponding to the second ROI 314 before deciding that no edges are located in this region.

If, at block 618, no edges are detected, then the OSMSD 112 determines whether a scan of a third ROI, such as ROI 316 of FIG. 3, is enabled (block 620). The third ROI 316 may be scanned, for example, to provide further validation that the numeric digits detected in the first ROI 306 represent a channel number and correspond to a channel change event. Users often surf the banner guide for information about available programming without having to actually change the currently tuned channel. When the banner guide is being displayed, the television 110 and/or set-top box 104 may be configured to display the number of the channel being surfed (for which information is being sought) in the first ROI 306 and the number of the current channel being viewed in the third ROI 316. Thus, the presence of numeric digits in the third ROI 316 may indicate that the numeric digits detected in the first ROI 306 are not indicative of a channel change, but are instead associated with a banner surfing event.

If, at block 618, the OSMSD 112 determines that edges are not present in the second ROI 314 (i.e., that the background area is quiet) or if scanning of the second ROI 314 is disabled, the OSMSD 112 may determine if scanning of a third ROI 316 is enabled (block 620). Again, the OSMSD 112 may read a location in memory 208 to determine if such scanning is enabled. If enabled, the OSMSD 112 scans the third ROI 316 to determine whether numeric digits are being displayed. Similar to the processing of the first ROI 306, during the scanning process, the gray-scale image corresponding to the third ROI 316 is converted to a black-and-white image based on one or more quantization thresholds. As discussed above, some televisions 110 and/or set-top boxes 104 are configured to display the channel number in the third ROI 316 (e.g., the upper left corner of the display area 304) when the surfing guide channel is being displayed in the first ROI 306 (e.g., the upper right corner of the display area 304). Thus, if numeric digits having channel number display characteristics are being displayed in the third ROI 316, then the numeric digits detected in the first ROI 306 may represent banner surf channel numbers instead of actual channel numbers (block 622). If the first ROI 306 contains channel numbers and the third ROI 316 contains channel numbers, then the determination made with respect to the first ROI 306 may represent a false positive. To detect the display of numeric digits in the third ROI 316, any of the methods/tests described above with respect to examining the first ROI 306 may be used.

Thus, if one or more digits are detected in the third ROI 316 (block 624), the OSMSD 112 clears the consecutive detection counter (block 610). If no digits are detected (block 624), or scanning of the third ROI 316 is disabled (block 620), then the channel numbers detected in the first ROI 306 are not treated as a false positive (i.e., they are treated as a valid detection). (It should be noted that, similar to the processing of the first ROI 306, in the event that no digits are detected, and if multiple quantization thresholds are available, the OSMSD 112 may attempt to re-convert and/or re-scan the black-and-white image corresponding to the third ROI 316 before deciding that no digits are located in this region.) In this case, the OSMSD 112 determines whether the channel numbers being displayed in the first ROI 306 have been displayed for at least a minimum number of consecutive frames by determining whether the consecutive detection counter exceeds a predetermined threshold (block 626).

If the consecutive detection counter does not exceed the predetermined threshold (block 626), then the channel numbers detected in the first ROI 306 have not been displayed for a sufficient number of video frames and, thus, control returns to block 602 and blocks subsequent thereto to capture another video frame as described above. If the consecutive detection counter does exceed the predetermined threshold (block 626), then the channel numbers detected in the first ROI 306 have been displayed for a sufficient number of frames and control passes to block 628. At block 628, the OSMSD 112 checks whether the channel numbers currently being displayed in the first ROI 306 match the channel numbers that were captured in connection with the most recent channel change. The OSMSD 112 performs this operation by comparing the current captured ROI image that contains the current channel numbers with a reference image or template that contains the channel numbers that were most recently displayed. If the current captured channel number image matches the previously captured reference channel number image/template, then a channel change has not occurred. Instead, the viewer has caused the channel number of the channel currently being viewed to be displayed, most likely for informational purposes. Thus, the OSMSD 112 clears the consecutive detection counter (block 610) and control loops back to capture another video frame (block 602). If the channel numbers currently being displayed do not match the channel number previously displayed, then a channel change has occurred. In this case, the OSMSD 112 stores the current channel number ROI image for use as a reference image/template for comparison to subsequent channel number displays (block 630). The OSMSD 112 then reports the channel change event (block 632). Furthermore, as discussed above, the reported channel change event (block 632) may cause the OSMSD 112 to send information to the people meter 116 of FIG. 1 to cause the people meter 116 to prompt the audience members to indicate their presence in the viewing audience.

In addition to reporting the channel change at block 632, the process 600 may also save and/or report the channel number being displayed, for example, for purposes of channel identification. Persons having ordinary skill in the art will appreciate that there are many ways to save and/or report the channel number. For example, a digitized image of the channel number may be captured and stored in memory 208 for later transmission over the network 218 to the central processing facility 222. As another example, the OSMSD 112 may convert the digitized image of the channel number to a numeric value using any image identification technique(s). The numeric value could be stored in memory 208 for later transmission over the network 218 to the central processing facility 222. In yet another example, the OSMSD 112 may compare the captured channel number image to a series of stored templates representing images of all possible channel numbers until a match is detected. Digital information identifying the channel number represented by the matching template may then be stored in memory 208 and/or transmitted over the network 218, and, thereby, used to report the current channel number to the central processing facility 222. The central processing facility 222 may use the reported channel number to determine viewing statistics about, for example, the audience being monitored, the channels being viewed, the programs being viewed, etc. Channel number identification is discussed in greater detail below in conjunction with the description of FIGS. 11A, 11B, and 11C.

Figure 6B:
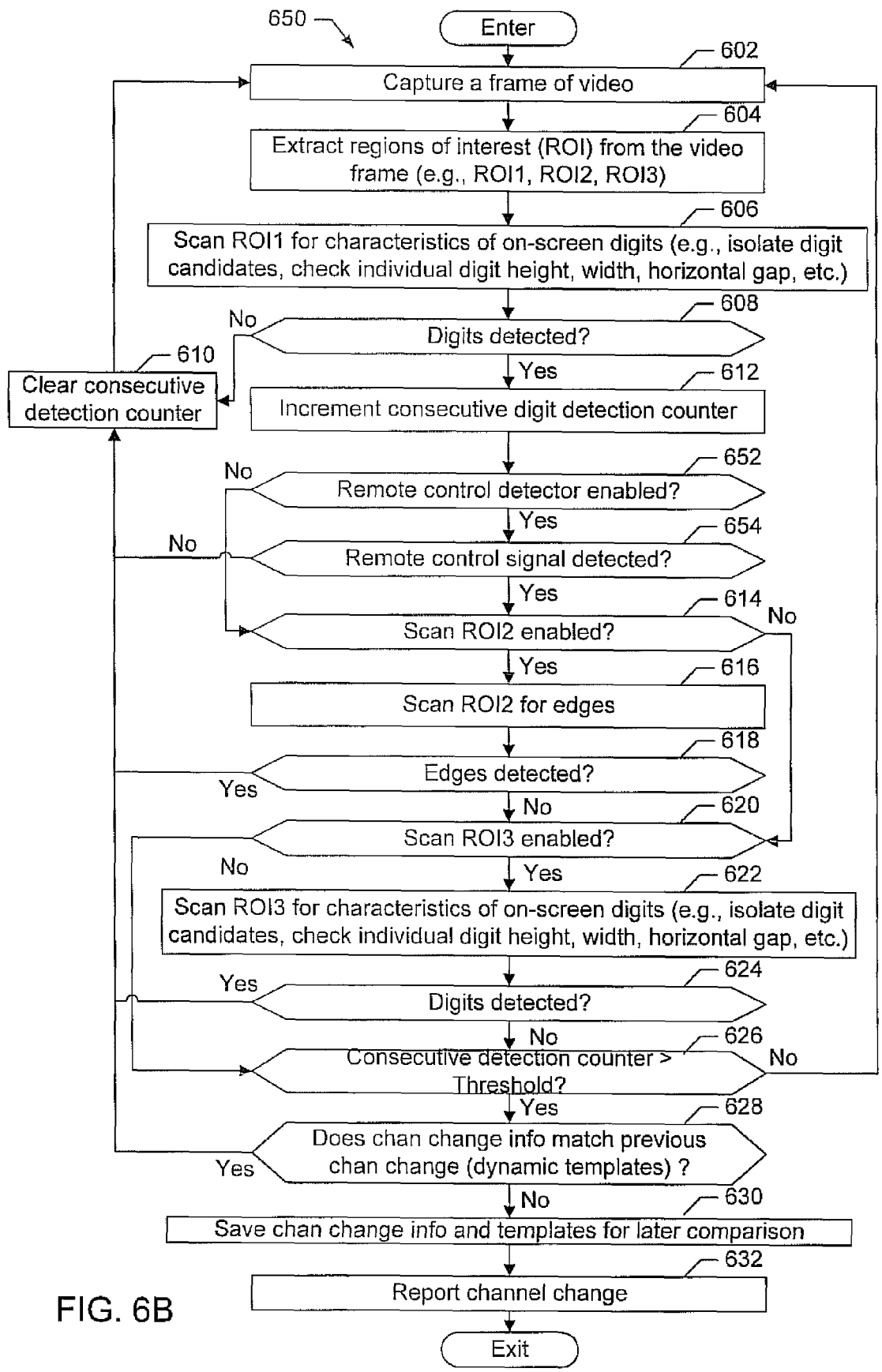
FIG. 6B illustrates a flow diagram of a second example process to determine whether a channel change event has occurred.

Another example process 650 for determining whether a channel change has occurred is shown in the flowchart of FIG. 6B. The example process 650 is similar to the example process 600 but further comprises the use of information from the remote control device 114 to reduce the likelihood of a false positive determination. As there is significant overlap between the flowcharts of FIGS. 6A and 6B, in the interest of brevity, substantially similar blocks appearing in both figures will not be re-described here. Instead, the interested reader is referred to the above description of FIG. 6A for a complete description of the corresponding blocks. To assist the reader in this process, substantially similar blocks are labeled with identical reference numerals in the figures. Moreover, to reduce the complexity of FIG. 6B, the retry procedure of block 609 in FIG. 6A is omitted in the example process 650. However, persons having ordinary skill in the art will recognize that an equivalent retry procedure could be inserted into process 650 at a similar location as for the process 600 of FIG. 6A, or at any other appropriate location.

Comparing FIG. 6B to FIG. 6A, in the event that a numeric digit was detected, thereby causing the digit detection counter to be incremented (block 612), then an OSMSD 112 performing the process 650 of FIG. 6B determines whether the remote control detector 213 is enabled (block 602). For example, the OSMSD 112 may read a location in memory 208 to determine whether the detection of signals from the remote control device 114 should be used to determine whether a channel change event has occurred. If the remote control detector 213 is enabled (block 652), then the OSMSD 112 determines whether the remote control detector 213 received and/or decoded a signal from the remote control device 114 within a window of time preceding the detection of the numeric digits (block 654). If a signal was received and/or decoded by the remote control detector 213 (block 654), or the remote control detector 213 is not enabled (block 652), control passes to block 614, whose operation is described above. If a signal was not received by the remote control detector 213 (block 654), the control proceeds to block 610 and blocks subsequent thereto (as described above) wherein the digit detection counter is cleared to indicate that a channel number has not been detected in the current frame and another video frame is captured for examination.

Persons having ordinary skill in the art will appreciate that information received from the remote control device may be used at any point in the example processes 600 and 650 to assist the identification of a channel change event. For example, the remote control detection procedures of block 652 and 654 of FIG. 6B may be used after a numeric digit is detected in the first ROI 306 (e.g., after block 612). Alternatively, the remote control detection procedure may be used after either of the second or third ROIs (314 or 316, respectively) have been examined (e.g., block 618 or 624) or as an initial step of the process 600 or 650 that precedes the examination of the first ROI 306. Likewise, the detection of remote control information may be used as a trigger to cause one or more of the blocks in the processes 600 or 650 to be executed.

Image Quantization

Figure 7:
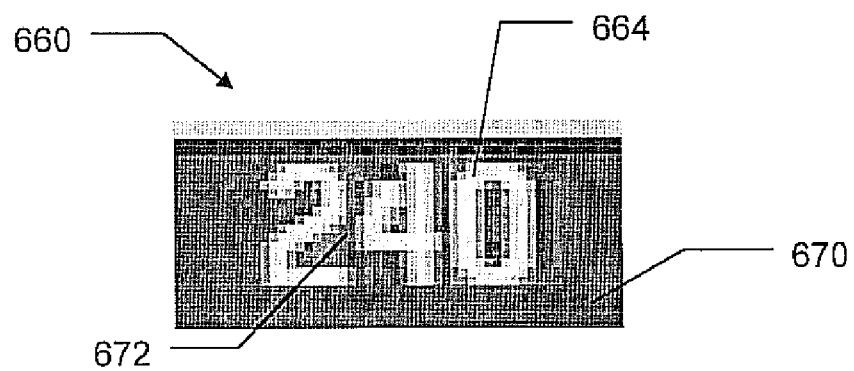
FIG. 7 is an example of content that may be displayed in an example region of interest captured by the framegrabber of FIG. 1.
Figure 8:
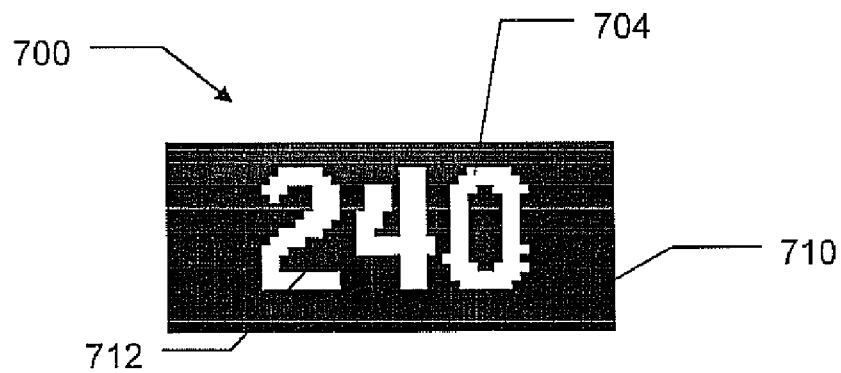
FIG. 8 depicts the example content of FIG. 7 after conversion from a grayscale image to a black-and-white image.

While the above examples and discussion concerned detection of channel numbers, the OSMSD 112 may also, without limitation, detect symbols and/or icons. In particular, the OSMSD 112 may detect symbols, such as the "TV Guide" symbol 332 shown in FIG. 4B, and/or detect network broadcast icons, such as the "HBO" icon 324 shown in FIG. 4B. An example ROI 660 representative of ROIs 306 and/or 316 of FIG. 4A is illustrated in FIG. 7. As mentioned above, ROI 660 may be extracted by the OSMSD 112 from a screenshot captured by framegrabber 108. To reduce the memory storage and/or processing requirements, the grayscale ROI 660 may be quantized to a black-and-white (e.g., binary) ROI 700 shown in FIG. 8. In the example of FIG. 7, ROI 660 includes a channel number 664, a solid color background (quiet area) 670, and an area 672 between two digits. The same example ROI after conversion by the OSMSD 112 from grayscale to black-and-white is illustrated as ROI 700 in FIG. 8. As can be seen in FIGS. 7 and 8, the lightly shaded channel number 664 is converted to a white channel number 704. The darkly shaded background 670 and areas between digits 672 are converted to the black regions 710 and 712, respectively. To perform the transformation from ROI 660 to ROI 700, light and/or dark thresholds may be used to set an intensity level above which all pixels are converted to white and below which all pixels are converted to black. Using such a quantization threshold to convert grayscale (or color) images to black-and-white images simplifies both the edge detection and/or the channel number comparison procedures. For edge detection (either for channel number detection in ROIs 306 and/or 316 or characterization of quiet area ROI 314), the corresponding procedure identifies columns and/or rows of pixels that change from black to white (or white to black depending on the polarity of the display used by the particular set-top box 104) as the image is scanned vertically and/or horizontally. Moreover, the OSMSD 112 may be given an optional polarity parameter to initialize the edge detection procedure with an expected, dominant background color (e.g., white or black) for a particular set-top box 104. The corresponding procedure for channel number comparison is discussed in greater detail below.

Based on the characteristics of the background areas in the one or more regions of interest (e.g., ROI 306 or 316) and the programming content displayed in the display area 304, a single quantization threshold may not be sufficient to yield robust performance. For example, if the background area 308 in the first ROI 306 is transparent or semi-transparent, the difference in intensity between the displayed channel number 310 and the background 308 will depend on the intensity of the displayed program content that coincides with the first ROI 306. For example, if the channel number 310 is represented using a light color (e.g., white), then coincident program content whose intensity is relatively light in the first ROI 306 may require a different quantization threshold than for the case of content whose intensity is dark in this region.

Thus, the example procedure 600 of FIG. 6A supports the use of multiple quantization thresholds as represented by block 609.

In the example procedure 600, the quantization thresholds may be selected and used as follows. First, a baseline threshold is calibrated based on the display characteristics of the set-top box 104 and/or television 110. Many set-top boxes 104 and televisions 110 may be interrogated to provide a baseline (reference) grayscale value. Next, at each point in procedure 600 where an image is quantized to a black-and-white format, a first quantization attempt may be performed using the initial quantization threshold. If a positive result is achieved based on the quantized image (e.g., a number is detected in the case of ROIs 306 and/or 316 or an edge is detected in the case of ROI 314), then control passes to an appropriate subsequent point in the procedure. Conversely, if a negative result is achieved, then another threshold is attempted. For example, additional thresholds may be determined relative to the initial threshold (e.g., that deviate from the initial threshold by +/−4%, +/−10%, etc.). Multiple attempts may be made to quantize the image until the set of quantization thresholds is exhausted, at which point control would follow the path corresponding to a negative result at the respective point in the procedure 600. Persons having ordinary skill in the art will recognize that many techniques may be used to determine one or more quantization thresholds, of which the preceding is one such example.

Image Characteristics

Figure 9:
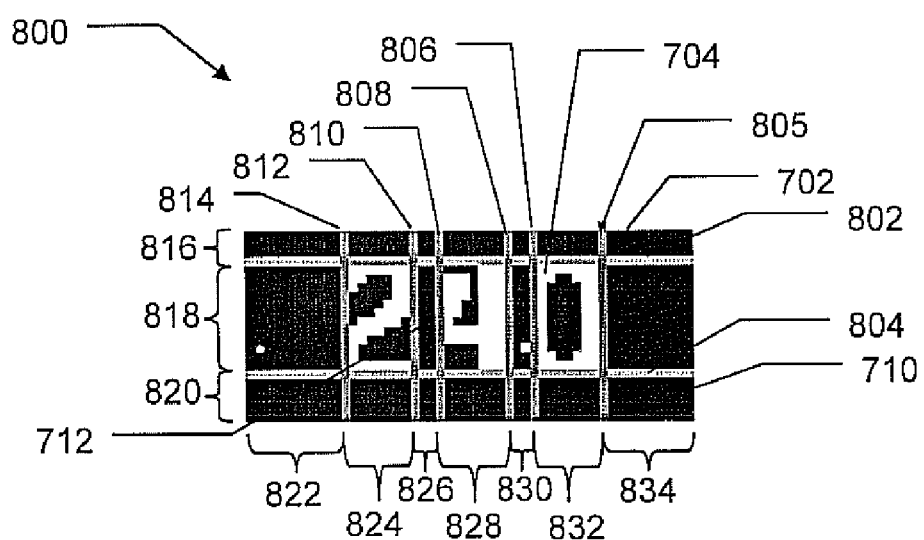
FIG. 9 illustrates a set of example characteristics for the example content shown in FIG. 8.

FIG. 9 illustrates an example set of characteristics associated with ROI 700 of FIG. 8 that may be detected and/or examined to determine whether the displayed matter constitutes a channel number display. For example, the distance between an upper horizontal edge 802 and a lower horizontal edge 804 defines a character height 818 which may be compared to upper and/or lower expected character height thresholds when determining if on-screen channel numbers are present. The distance between opposed vertical edges 805, 806, 808, 810, 812, 814 define character widths 824, 828, 832 which may be compared to upper and/or lower expected character width thresholds when determining if on-screen channel numbers are present. In addition, the distance between opposite vertical edges 805, 806, 808, 810, 812, 814 may be used to define the spacing 826, 830 between characters which may be compared to upper and/or lower expected character spacing thresholds when determining if on-screen channel numbers are present. Still further, the distance between appropriate edges may be used to define the centering characteristics 816, 820, 822, 834 of a displayed digit which may be compared to upper and/or lower expected character centering thresholds when determining if on-screen channel numbers are present. As will be appreciated by persons having ordinary skill in the art, one or more edge detection techniques may be used to identify the location of one or more edges and the distance between the edges may then be used to define the height, width, etc., of a numeric digit. Alternately, a number of pixels having the same color characteristic that are disposed adjacent to one another and that extend in a particular direction, such as horizontally, may be counted to determine the width of a numeric digit. Likewise, the number of adjacent, commonly colored pixels extending in a vertical direction may be counted to determine the height of a numeric digit.

After the channel change detection process (e.g., process 600 or 650 described previously) detects a channel number in the appropriate ROI (e.g., ROI 306) based on, for example, the characteristics described above, and ascertains that the displayed number does not correspond to a banner surfing event, the process then compares the detected channel number with the previous channel number (e.g., block 628 of FIG. 6A). While any technique may be used to perform this comparison, a preferred approach is based on computing the dot-product of the quantized image corresponding to the ROI containing the current channel number with a stored reference image/template corresponding to the previous channel number. As described above, the ROI containing the current channel number is captured by the framegrabber 108 and converted (quantized) to a black-and-white image. Similarly, the stored reference image/template corresponding to the previous channel number is also a black-and-white image that may correspond to, for example, a previously captured ROI or an ideal representation of the stored number based on the characteristics of the set-top box 104 and/or television 110. In either case, the dot-product is computed by multiplying corresponding pixels of the quantized ROI image and the stored reference image/template to form an intermediate set of inner-products at each pixel location. Then, the intermediate inner-products are summed to form the dot-product. Mathematically, the dot-product is given by the expression:

$$dotproduct = \sum_r \sum_c image(r, c) \times template(r, c)$$

where image(r,c) represents the value of the captured ROI image at the pixel location (r,c), template(r,c) represents the value of the stored reference image/template at the pixel location (r,c) and the index (r,c) references the pixel location at the $r^{th}$ row and $c^{th}$ column of the corresponding image.

For a black-and-white image, a white pixel may be represented by a value equal to 1 and a black pixel may be represented by a value equal to −1 (note that any antipodal or other equivalent representation may be used). Then, the inner-product of two like pixel values results in a value of 1, whereas the inner-product of two different pixel values results in a value of −1, i.e., white×white=1×1=1;
black×black=−1×−1=1;
white×black=1×−1=−1;
black×white=−1×1=−1.

Thus, if the captured ROI image and the stored reference image/template are similar, the inner-products will constructively add and the resulting dot-product will be a large positive value. Conversely, if the two images are dissimilar, the inner-products will destructively add and the resulting dot-product will be in the range of a small positive value to a large negative value.

Based on the previous definition of the dot-product and the representation of the respective images, a number of useful criteria may be used to compare the channel number of the captured ROI to the previous channel number represented by the stored reference image/template. One such preferred criterion is a number-equivalence criterion, which is defined to be the ratio of dot-product to the total number of pixel elements in an image, i.e., $$criterion = \frac{dotproduct}{numpixels} = \frac{dotproduct}{RC}$$

where numpixels is the total number of pixels in an image, which is equal to the number of pixels in a row, R, multiplied by the number of pixels in a column, C. Given that the values of the pixels are either 1 or −1 for a black-and-white image, equivalent expressions for the number-equivalence criterion defined above include:

$$criterion = \frac{(num \text{ same pixels} - num \text{ diff pixels})}{numpixels};$$

$$criterion = \frac{(num \text{ same pixels} - num \text{ diff pixels})}{(num \text{ same pixels} + num \text{ diff pixels})}; \text{ or}$$

$$criterion = \text{ratio of same pixels} - \text{ratio of different pixels}$$

where num same pixels denotes the number of pixel location for which the values of the captured ROI image and the stored template are the same and num diff pixels denotes the number of pixel location for which the values are different. The quantity ratio of same pixels is equal to num same pixels divided by the total number of pixel locations (numpixels) and the quantity ratio of different pixels equals num diff pixels divided by numpixels. One of these previous expressions may be preferred over the others depending on the implementation.

The channel change detection process (e.g., process 600 or 650) may use the number-equivalence criterion defined above to determine whether the channel number represented by the captured ROI image is substantially similar to or substantially different from the previous channel number represented by the stored reference image/template. For example, the process may determine that the numbers are substantially similar and, thus, no channel change has occurred if the criterion has a threshold criterion value of ≧95%. If the criterion has a value <95%, then the process may determine that the numbers are substantially different and, thus, that a channel change has occurred.

Figure 10:
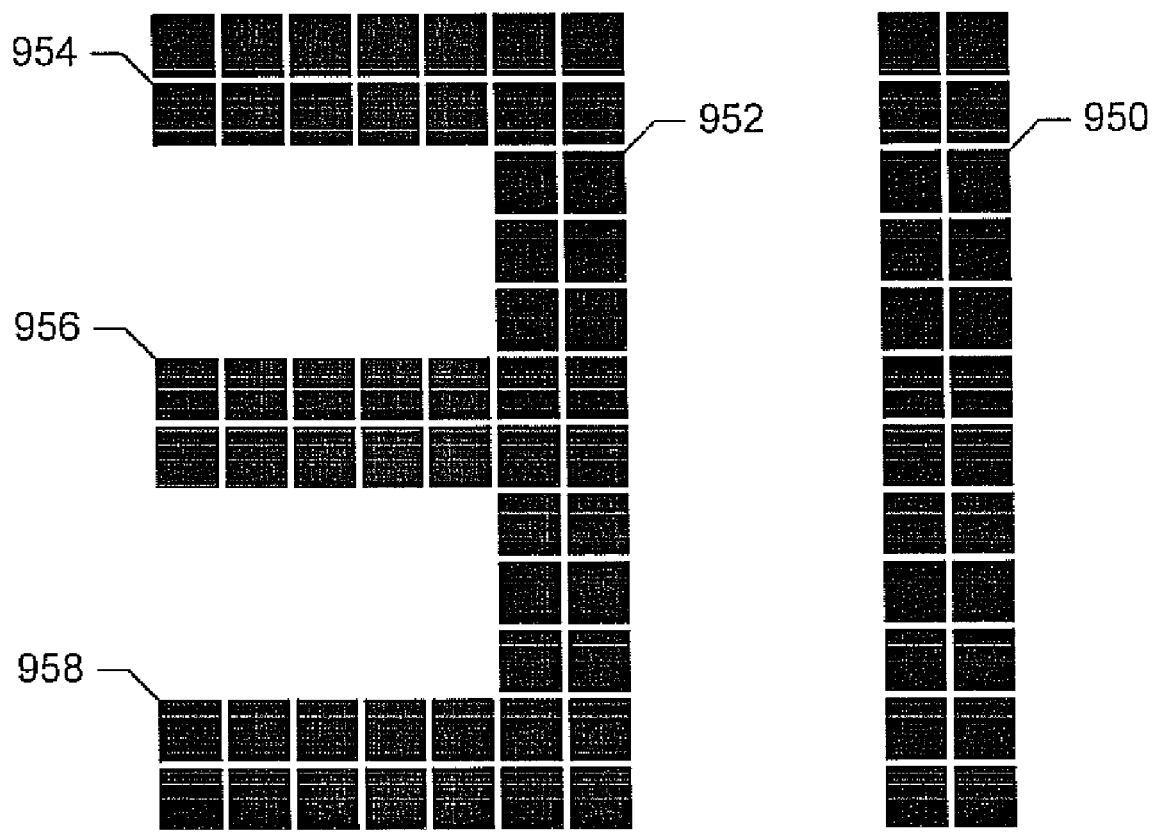
FIG. 10 illustrates a set of example numeric components arranged to form a set of numeric digits.

Referring to FIG. 10, to reduce the complexity of any algorithm used to determine whether the displayed content represents a numeric digit, the displayed content may be examined to determine whether it contains components representative of numeric digits. For example, the numeral one may be treated as a numeric digit having a single component comprising a set of adjacent, commonly colored/shaded pixels 950 extending vertically for a predefined number of pixel locations wherein the predefined number of pixel locations is representative of the expected height of a numeral one based on the height characteristics stored in the associated television or set-top box. By way of further example, a numeral three may be treated as having three horizontally disposed components 954, 956, 958 and a single, vertically disposed component 952. If the detected components have the proper characteristics (i.e., the characteristics that match the display characteristics of the television 110 and/or set-top box 104 that govern the display of numbers), then the OSMSD 112 may indicate that an on-screen channel number display has been detected. For example, the OSMSD 112 may compare the positions of one or more of a set of detected components to a set of stored component configurations corresponding to the display of a numeric digit. If a match is identified, then the OSMSD 112 may indicate that an on-screen channel number display has been detected. The OSMSD 112 may further use information associated with the matching configuration to identify the value of the channel number being displayed. In another example, the OSMSD 112 may not compare the arrangement of the components relative to each other and/or relative to component configuration information stored in memory. Instead, the OSMSD 112 may merely examine the characteristics of the components and, provided that such components have a set of characteristics expected of a set of displayed numeric digit components, then the OSMSD 112 may identify such components as being indicative of an on-screen numeric digit display.

Figure 11A:
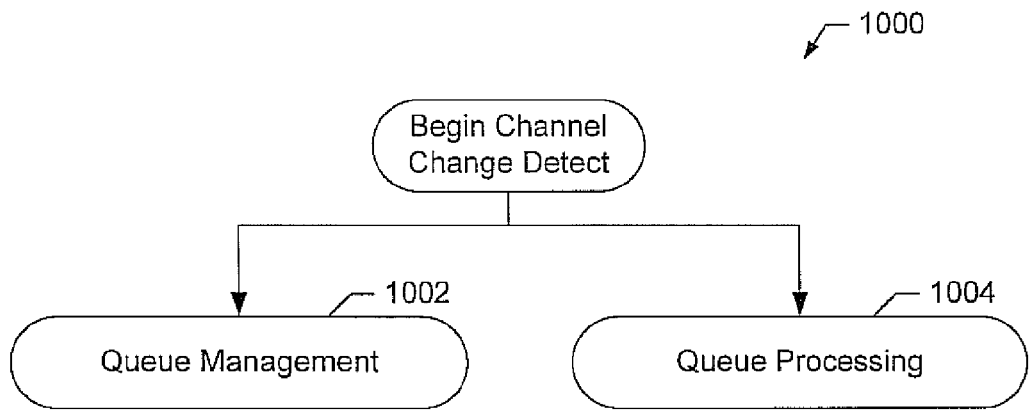
FIGS. 11A-11C illustrate flow diagrams of an example process to identify a displayed channel number.

The channel change detection process, such as the process 600 or 650, may be augmented to not only detect a channel change event but also identify the newly selected channel. An example process 1000 for identifying a displayed channel number is shown in FIG. 11A. Given the additional processing resources and time that may be needed to identify a channel number, the example process 1000 may execute in parallel as a background process to the foreground channel change detection processes 600 or 650. To accomplish this type of execution, the example channel identification process 1000 employs a queue to store pending channel number ROI images that are awaiting identification. Referring to FIG. 11A, the example process 1000 includes two sub-processes 1002 and 1004 that execute in parallel (although the processes 1002 and 1004 could be configured to execute in a serial fashion as well). The purpose of the sub-process 1002, queue management, is to add channel number ROI images to the image queue. The purpose of the sub-process 1004, queue processing, is to process ROI images stored in the image queue.

Figure 11B:
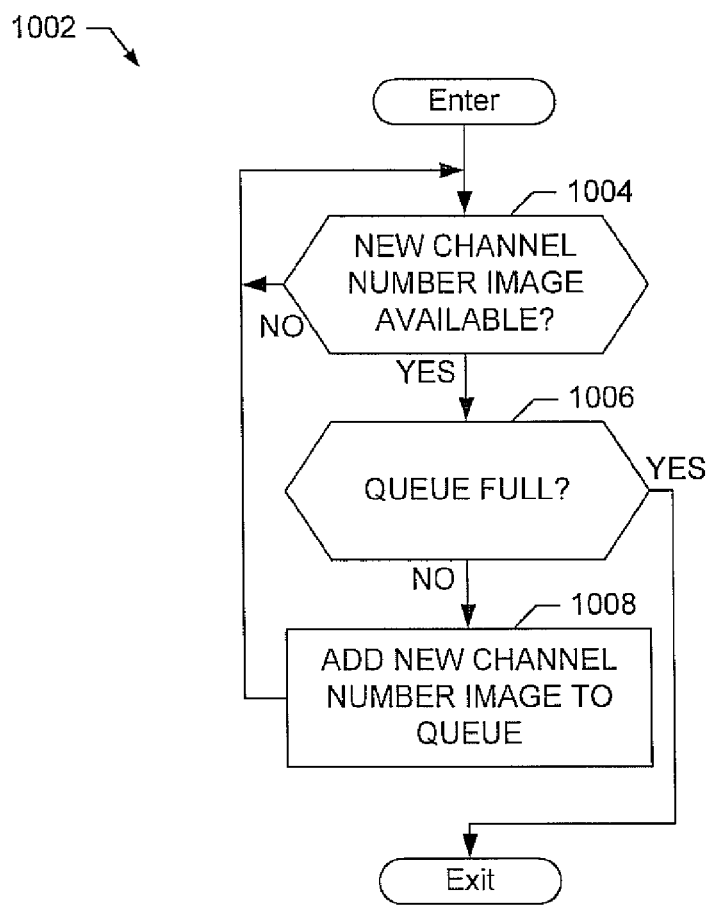

Sub-process 1002 is shown in FIG. 11B, in which control begins at block 1005 where the OSCCD 112 determines whether a new channel number ROI image is available (e.g., from the output of example processes 600 or 650). If a new image is not available, control returns to block 1005 where the OSMSD 112 waits for a new image to become available. If, instead, a new image is available, then the OSMSD 112 examines the state of the image queue. If the image queue is not full (block 1006), then the OSMSD 112 adds the new channel number ROI image to the queue (block 1008). After the image is added to the queue, control returns to block 1005 where the OSMSD 112 waits for a new channel number ROI image to become available. However, if at block 1006 the OSMSD 112 determines that the queue is full, an error condition may be invoked causing the example process 1002 to exit.

Figure 11C:
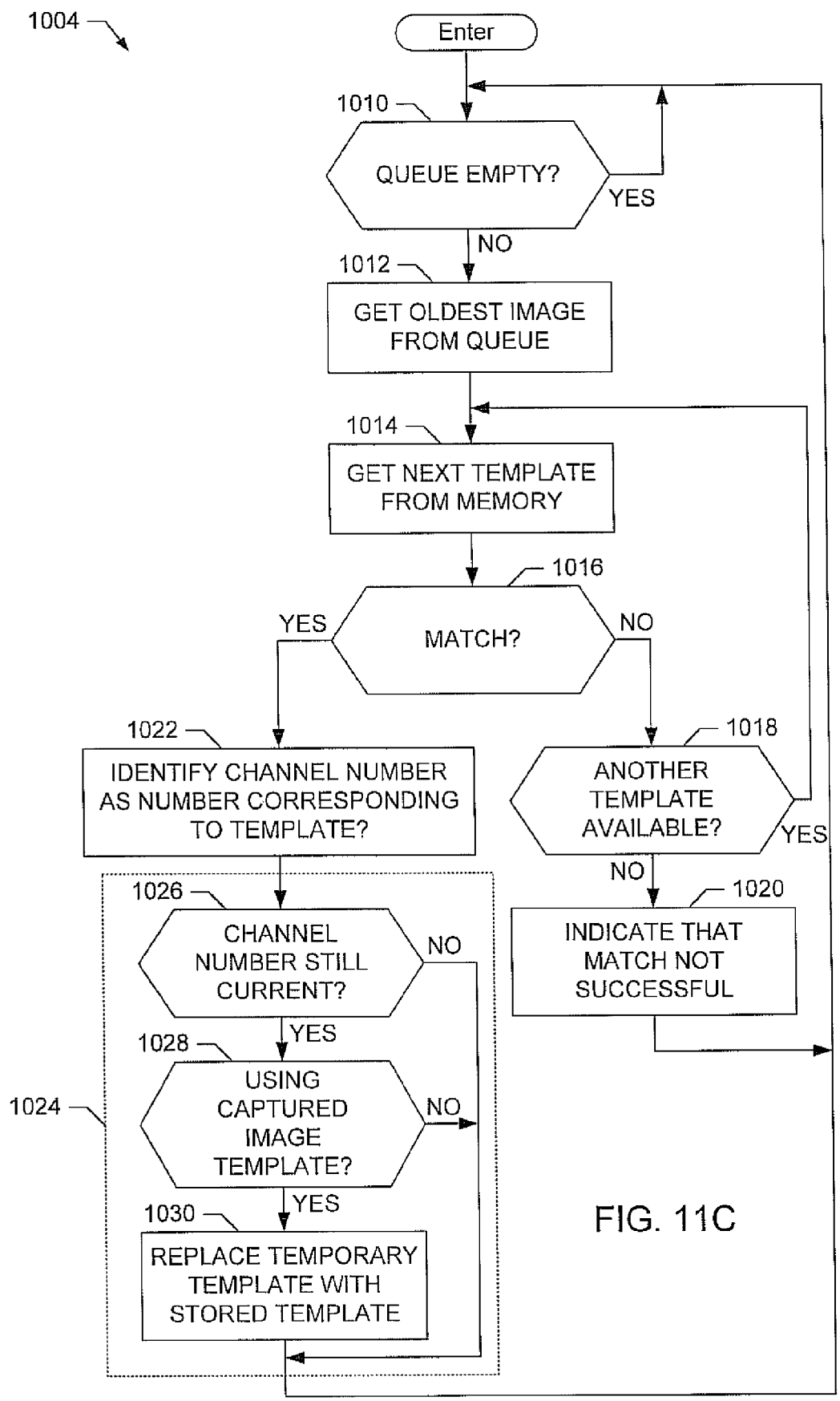

Sub-process 1004 is shown in FIG. 11C, in which control begins at block 1010 where the OSMSD 112 determines whether the image queue contains any channel number ROI images. If the queue is empty, control returns to block 1010 where the OSMSD 112 waits for an image to be added to the queue. If, instead, the queue is not empty, control proceeds to block 1012 where the OSMSD 112 gets the oldest image stored in the queue for the case where the queue has a first-in first-out (FIFO) configuration. A last-in first-out (LIFO) configuration may also be used depending on the particular application of the channel identification procedure. In either case, after the OSMSD 112 obtains the next image to identify (block 1012), control proceeds to block 1014 where the OSMSD 112 gets a channel number image template from memory. The channel number image template is one of a set of templates corresponding to a set of known channel numbers. The OSMSD 112 then compares the captured channel number ROI image with the template image (block 1016). If the two images do not match, control proceeds to block 1018 where the OSMSD 112 determines if another stored template is available. If another template is available, control returns to block 1014 where the OSMSD 112 gets this next template from memory and control proceeds as described above. If another template is not available (block 1018), the OSMSD 112 generates a report indicating that channel identification was unsuccessful. Control then returns to block 1010 and proceeds as described above.

If, however, at block 1016 the OSMSD 112 determines that the captured channel number ROI image matches the stored channel number image template (e.g., based on the dot-product computation and the number-equivalence criterion described above), then control proceeds to block 1022. At block 1022, the OSMSD 112 generates a report that identifies the channel number in the captured ROI image as the channel number corresponding to the matched template. Control may then return to block 1010 and proceed as described above, or control may optionally proceed to the set of blocks included in block 1024.

The processing performed by block 1024 may be used to modify the channel change event detection process (e.g., processes 600 or 650) by replacing a reference image based on a previously captured channel number image (e.g., as used in block 628 of FIG. 6A) with a stored template having known characteristics. If block 1024 is enabled, then control proceeds from block 1022 as follows. After the channel number is identified based on the selected template (block 1022), control proceeds to block 1026 where the OSMSD 112 determines if the identified channel number is still being used as the reference channel number for the channel change event detection process (e.g., process 600 or 650). For example, the OSMSD 112 could examine the captured ROI image to determine whether it corresponds to the captured reference channel number image being used to determine the occurrence of a channel change event (e.g., based on a tag and/or header information included in the digital representation of each image). If the identified channel number is not being used (block 1028), then control returns to block 1010 and proceeds as described above. If, instead, the identified channel number is still active, then control proceeds to block 1028 where the OSMSD 112 determines whether a captured reference image or a stored template is being used as the reference channel number image. If a stored template is already in use (block 1028), then control returns to block 1010 and proceeds as described above. However, if a captured image is being used as the reference (block 1028), then the OSMSD 112 may replace the captured reference image with the corresponding template determined at block 1022. Control then returns to block 1010 and proceeds as described above.

The channel identification process may be off-loaded to, for example, a companion processor or even the central processing facility 222 for processing. In such a configuration, the OSMSD 112 would transmit the captured ROI images to the companion processor (e.g., via the interface circuits 210) and/or the central processing facility 222 (e.g., via the network 218).

The example methods and apparatus described herein may be applied to applications in addition to channel change event detection and channel number identification. For example, one or more of the ROIs, stored templates and/or reference characteristics may be modified to allow an OSMSD such as OSMSD 200 to detect changes in displayed letters/text and/or to also identify such letters/text. In another example, specific shapes/objects may be detected and/or identified based on the appropriate selection of ROIs, stored templates and reference characteristics.

An OSMSD such as OSMSD 200, 250 may also be used as a front-end filter or gate for any number of image processing and/or recognition algorithms (such as an on-screen display reader for processing captured images corresponding to received video frames). In such an application, the OSMSD 200, 250 (and/or a process similar to the channel change detection processes 600 or 650) may be used to select only those images to process that contain desired content, such as specific numerals, letters, objects, etc. As mentioned previously, the OSMSD 200, 250 (or similar process) could be configured to detect the desired numerals, letters, objects, etc. based on the selection of appropriate ROIs, stored templates and/or reference characteristics. In this way, the OSMSD 200, 250 (or similar process) could significantly reduce the processor and memory requirements for the associated image processing and/or recognition algorithms.

Viewing modes and media device sources may also be determined by ROI sequences. Different viewing features may exhibit a uniquely identifiable sequence of images, numbers, symbols, and/or icons after and/or during the user's invocation of the feature. For example, if a user invokes a pay-per-view (PPV) feature, the viewer may be presented with on or more acknowledgement screens, one or more screens requesting that the viewer wait while PPV selections are retrieved, and a list of PPV selections, corresponding times of viewing, screen shots, movie trailers, program descriptions, and/or prices for viewing. Because each of the screens appears in a predetermined sequence, the OSMSD 112 may monitor one or more ROIs for the predetermined sequence to identify viewer behavior. Although the following example includes ROI sequence detection for PPV of a set-top box, a similar process may be applied, without limitation, to VCRs, DVD players, and/or game consoles. In particular, manufacturers of different media devices typically display different sequences of screens when powered-up. A game console, for example, may display the manufacturer name and/or trademark of the game console before displaying any particular video game specific screens (e.g., Xbox® by Microsoft®). Additionally, a VCR may display a unique sequence of screen shots for a user when programming the VCR to record broadcast programs.

Figure 12A:
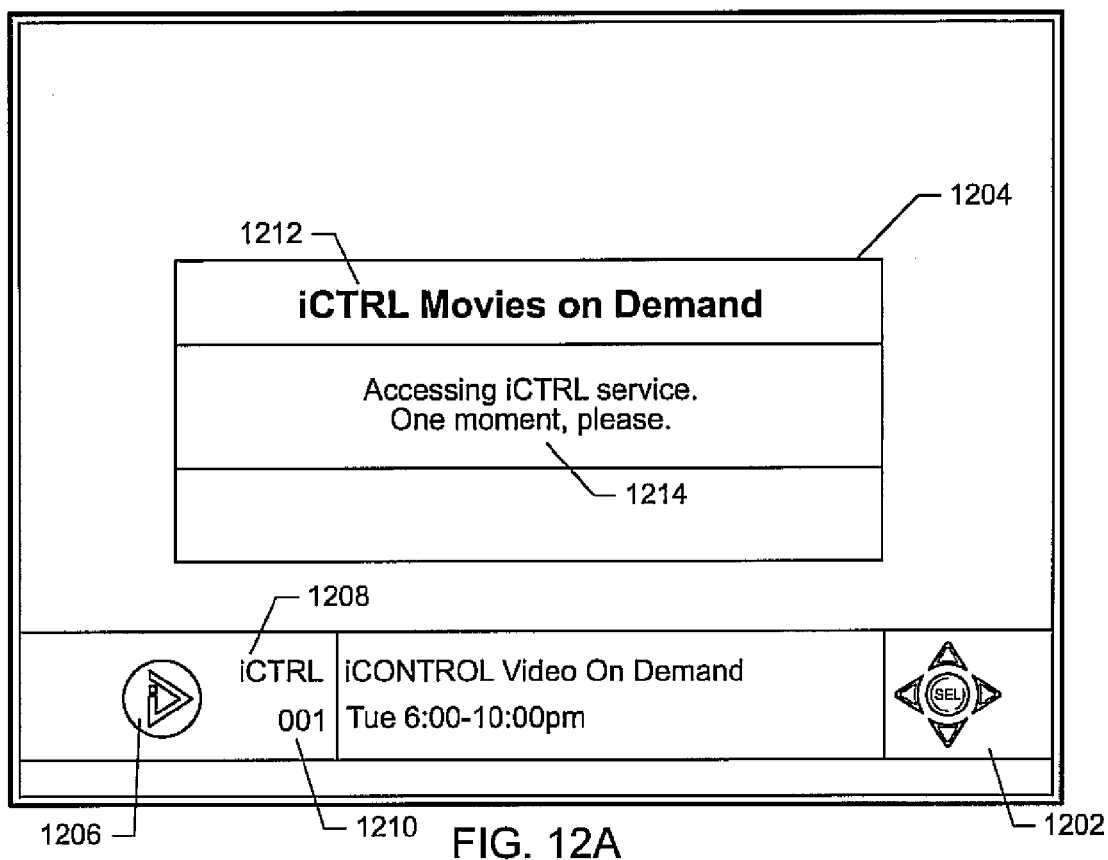
FIGS. 12A-12E depict a series of screens illustrating an example sequence of regions of interest detected by the example OSMSD.
Figure 12B:
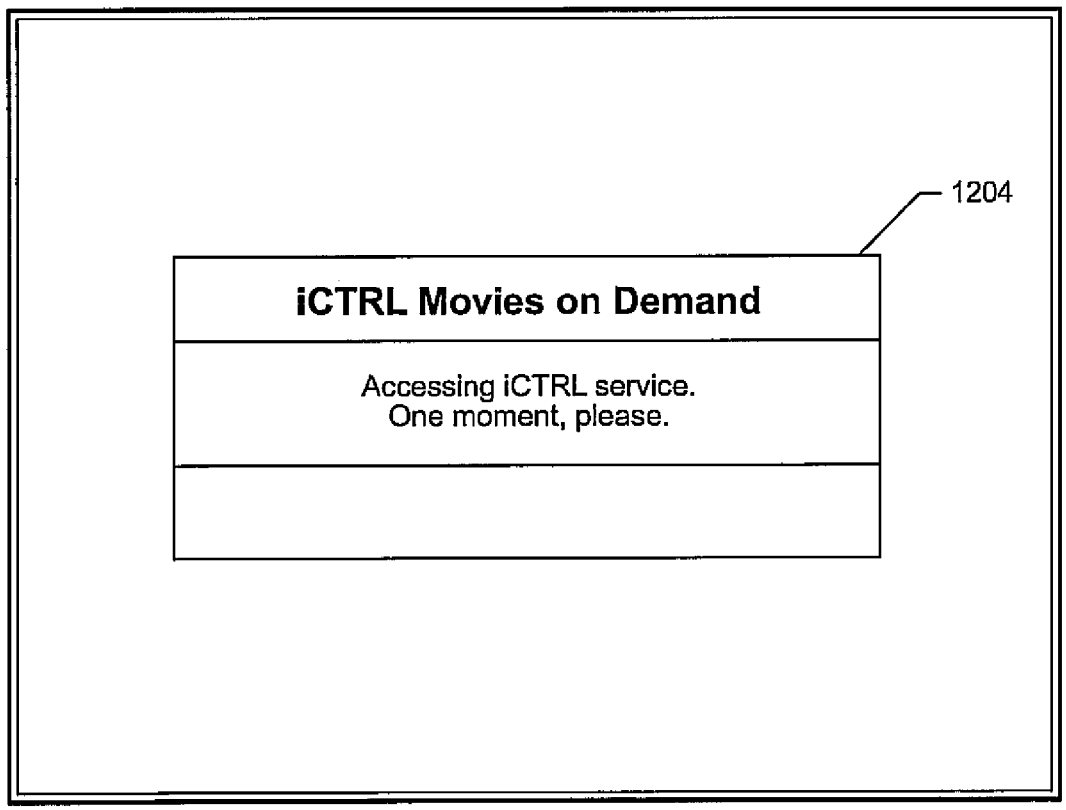
Figure 12C:
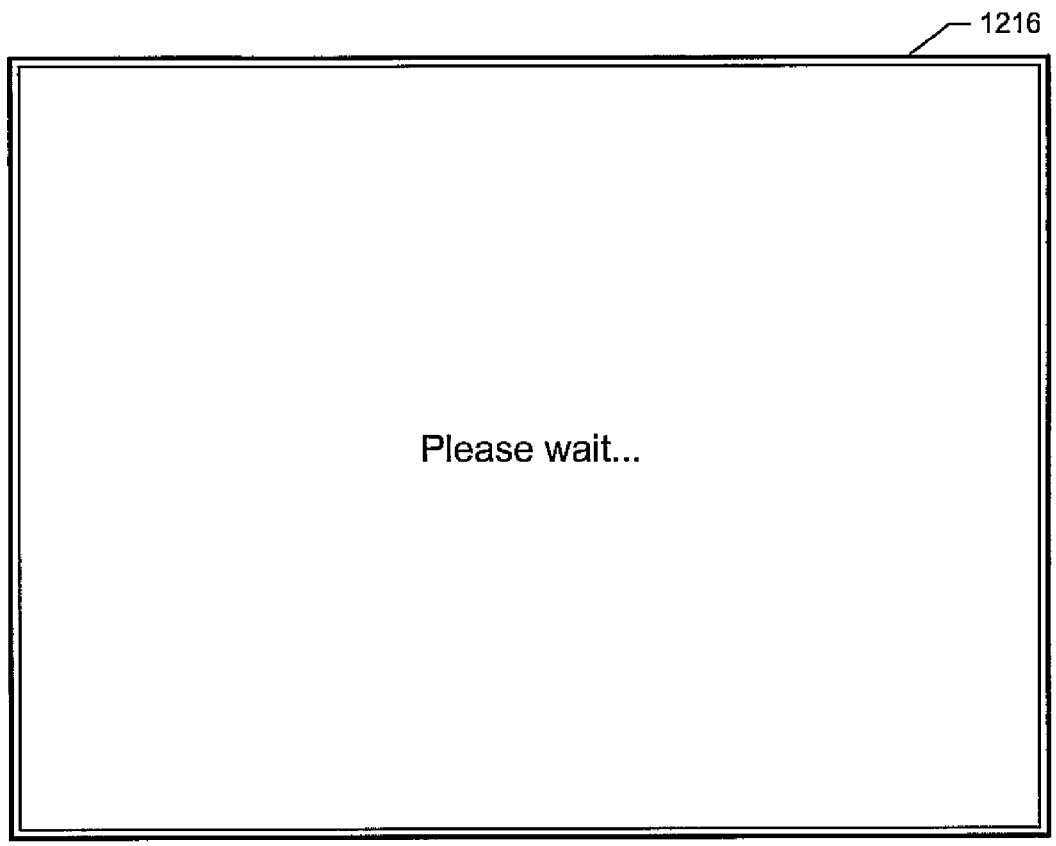
Figure 12D:
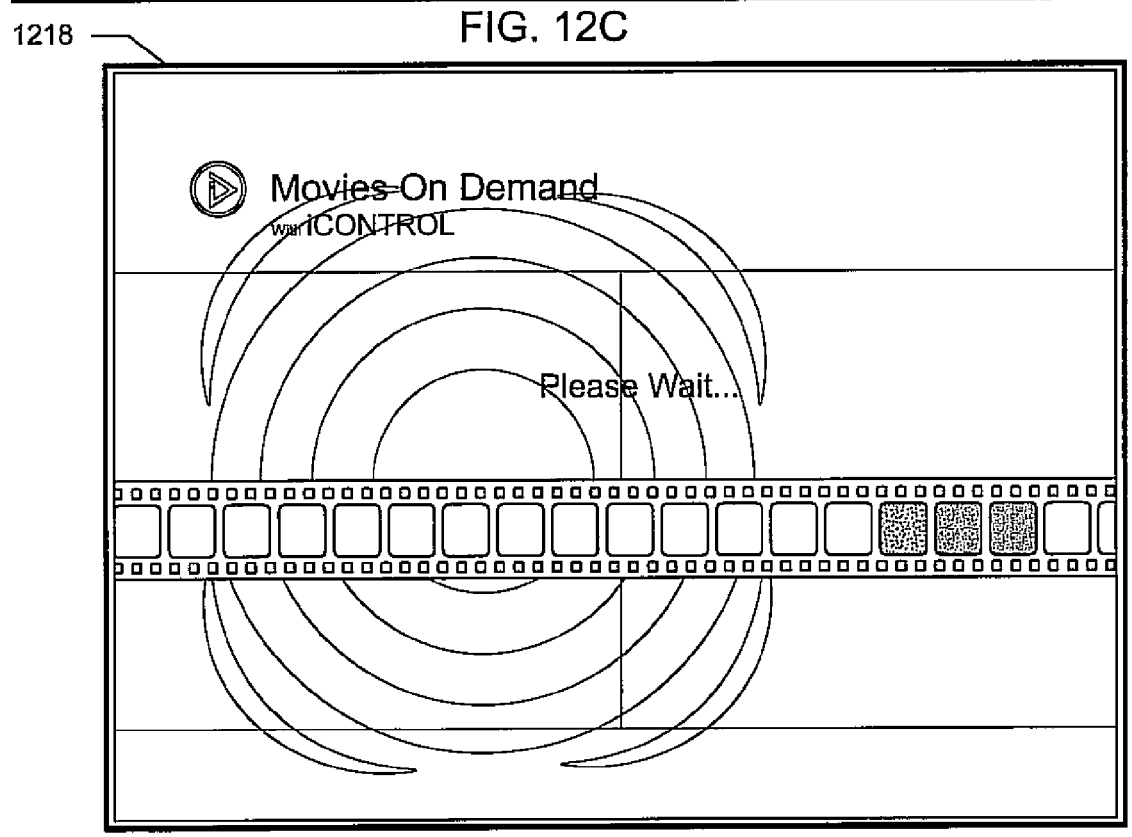
Figure 12E:
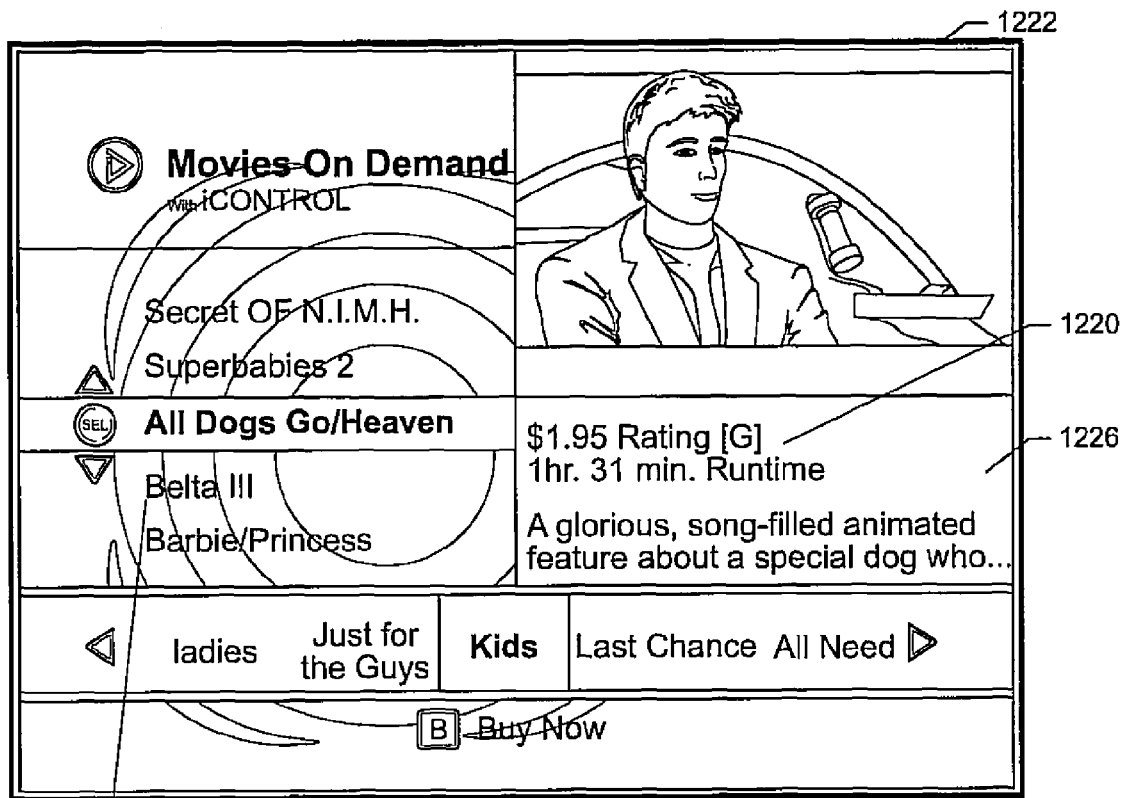

FIGS. 12A-12E illustrate an example sequence of screens that are displayed after a user invokes the example PPV feature. FIG. 12A illustrates an initial screen displayed after the viewer, for example, presses a PPV button on a remote control or set-top box. The OSMSD 112 may monitor a banner ROI 1202, a message-box ROI 1204, and/or one or more sub-ROIs within the banner 1202 and/or message box 1204. The OSMSD 112 may specifically monitor the banner 1202 for a PPV symbol 1206, a trademark name for the PPV feature (e.g., "iCTRL" 1208), and/or a particular channel number 1210. Additionally, the OSMSD 112 may monitor the message-box 1204 for the same trademark name 1212 and/or the phrase "One moment, please" 1214. The example PPV feature may next display a screen in which only the message-box 1204 remains and the banner 1202 is absent, as shown in FIG. 12B. While the PPV feature continues to initialize and/or acquire a list of available PPV programs, a simple text-based "please wait" screen 1216 may appear, as shown in FIG. 12C. Because PPV program data may be large, delays in providing the user with the information may take a finite amount of time, especially if the user is a satellite TV subscriber and weather conditions interfere with satellite signal reception. The received information may include an additional "please wait" screen 1218 that includes a more rich set of graphics, as shown in FIG. 12D. Finally, the example PPV screen sequence may end with a programming list, one or more screenshots 1222 of available PPV programs, price information 1224, and/or a narrative description of the PPV program 1226.

Figure 13:
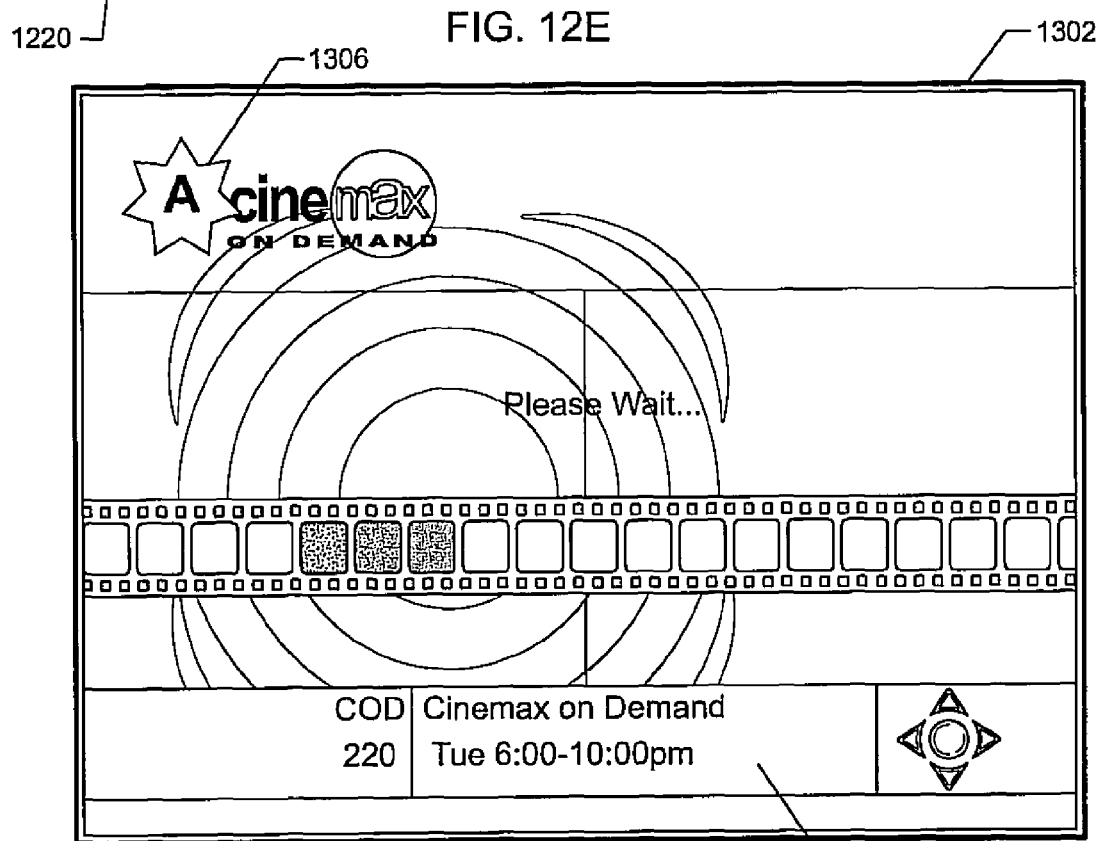
FIG. 13 illustrates an example video-on-demand screen.

Additionally, or alternatively, identification of viewing modes may be determined by the OSMSD 112 by monitoring for the presence of particular symbols. Broadcasters and/or set-to box manufacturers typically implement viewing functionality in a predictable manner. As such, a state diagram may illustrate appropriate ROIs that should be monitored to determine any subsequent viewer activity. Rather than require the OSMSD 112 to scan and process all ROIs to determine viewer activity, a selective ROI scan requires less OSMSD 112 processing power and increased response time. FIG. 13 illustrates an example screen 1303 in which a viewer has selected a VOD feature. The example screen includes a banner 1304, and a symbol 1306, which only appears on screen during a finite number of viewing modes of the example set-top box 104. As a result, when the symbol 1306 is detected by the OSMSD 112, then knowledge of which finite number of states that can occur next allows specific ROIs to be monitored.

Figure 14A:
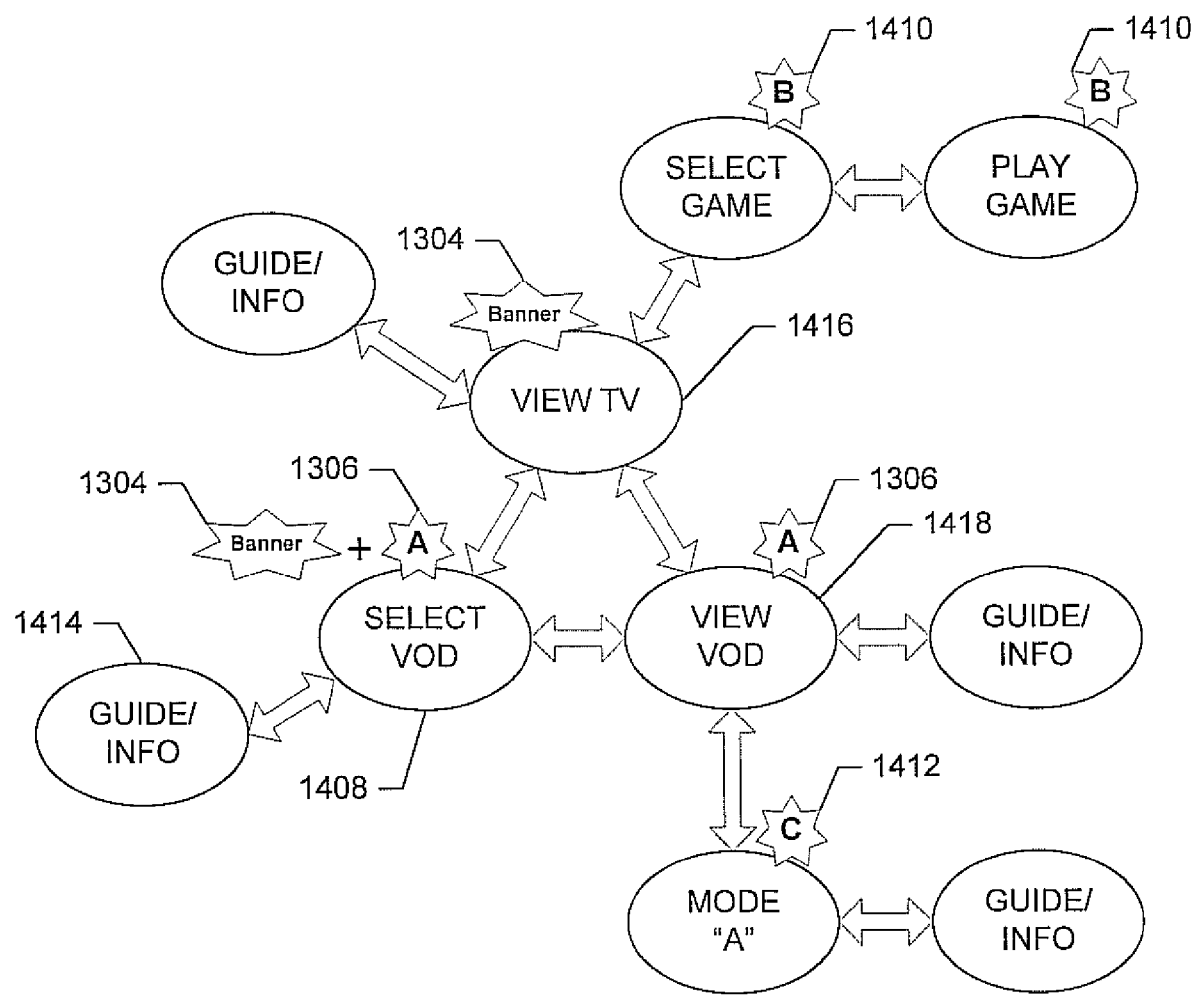
FIG. 14A illustrates an example state diagram of a media device.

FIG. 14A illustrates an example state diagram for an example set-top box 104. Without limitation, other manufacturers of set-top boxes may have a substantially different configuration of viewing modes. While the example state diagram illustrated in FIG. 14A is graphical, such graphical representation is for illustrative purposes and the state diagram may be in a machine readable format, without limitation. A "select VOD" state 1408 is representative of the VOD screen 1302 of FIG. 13. Because the "select VOD" state 1408 is known within the state diagram map of FIG. 14A, any subsequent state may be detected by monitoring a limited number of ROIs and/or possible symbols. For example, from the "select VOD" mode 1408, the OSMSD 112 does not need to concern itself with detecting symbol "B" 1410, symbol "C" 1412, or any of the ROIs for which those symbols are assigned. Because the next possible states are limited to "Guide/Info" 1414, "View TV" 1416 or "View VOD" 1418, the OSMSD 112 need only detect the disappearance of both the banner 1304 and symbol "A" 1306 (indicative of the "Guide/Info" state 1414), detect the disappearance of symbol "A" 1306 while the banner 1304 remains on-screen (indicative of the "View TV" mode 1416), or detect the disappearance of the banner 1304 while the symbol "A" 1306 remains on-screen (indicative of the "View VOD" mode 1418).

Figure 14B:
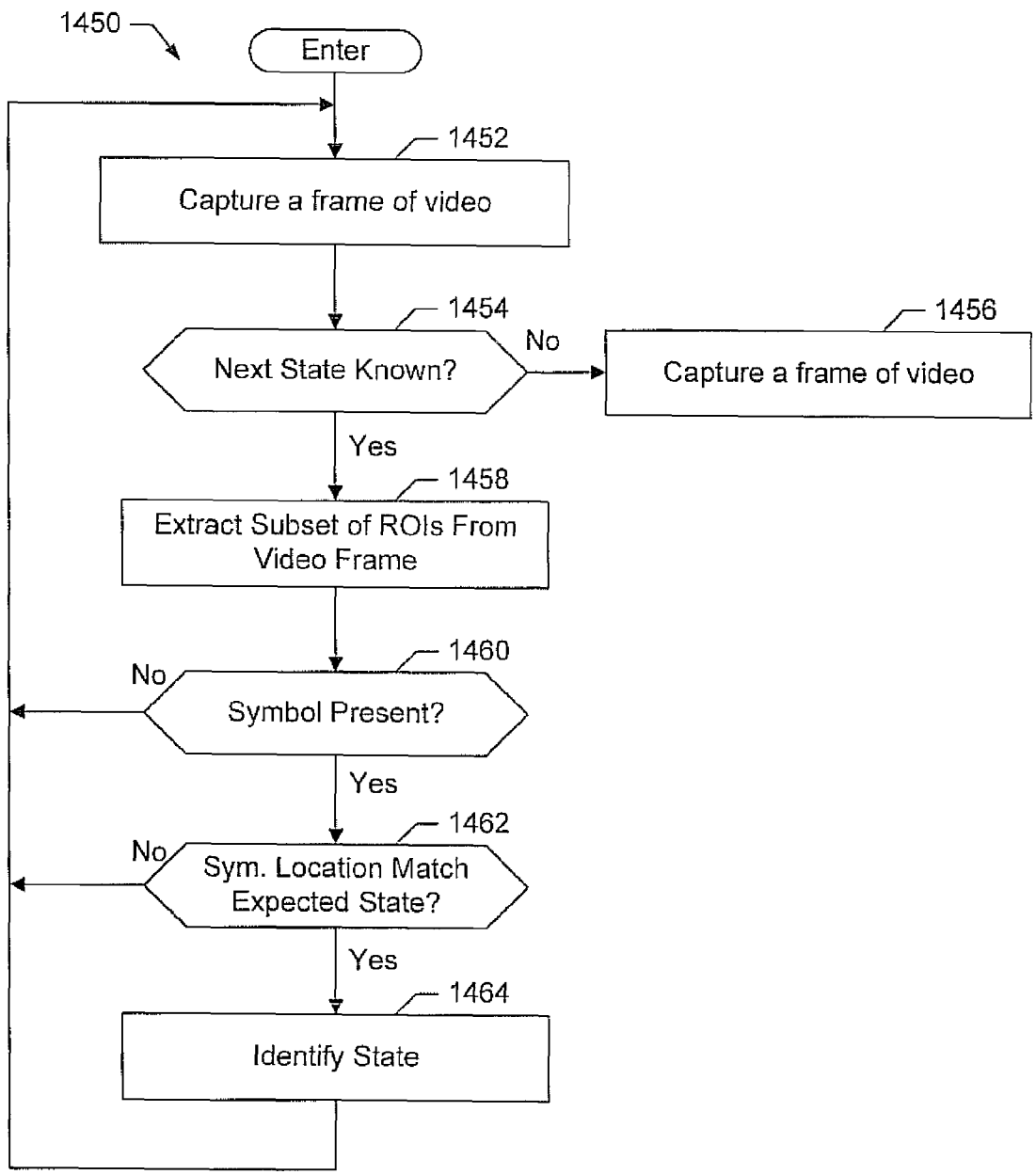
FIG. 14B illustrates a flow diagram of an example process to determine viewer activity based on screen sequences.

A flowchart illustrating an example process 1450 to determine viewer activity based on screen sequences is shown in FIG. 14B. The example process 1450 begins at block 1452 where the framegrabber 108 of FIG. 1 captures a screenshot corresponding to a frame of a video signal being delivered from, for example, the set-top box 104 to the TV 110. If the OSMSD 112 has not executed the example process 1450 at least once before to determine the viewer's current mode (block 1454), then the OSMSD 112 must extract all ROIs from the video frame for analysis (block 1456). On the other hand, if the next possible state of a media device, such as the example set-top box 104, is known, then the OSMSD 112 need only extract a subset of ROIs from the video frame (block 1458). The OSMSD 112 may be aware of the current state, and all possible next states, by virtue of a known state diagram, such as the state diagram shown in FIG. 14A. The state diagram of a media device is typically static and is a function of firmware programming on the media device. Such state diagrams may be published in user manuals, or empirically determined and/or stored in the OSMSD 112 before installation at a viewer's home.

If a known symbol is not present in the captured video frame (block 1460), the process repeats (block 1452) in an attempt to determine the mode of the example set-top box 104. On the other hand, if a known symbol is detected, the OSMSD 112 determines whether the presence of this symbol comports with any of the next possible modes in the state diagram. For example, if the prior mode was "View TV" 1416 and symbol "A" 1306 is detected without a banner 1304, then a candidate next mode exists (block 1462) and is identified (block 1464) as "View VOD." However, if an expected symbol was detected, but fails to match the state mapping, such as on the state diagram of FIG. 14A, then the example process 1450 repeats (block 1452). Such results may occur if the OSMSD 112 is not fully aware of all possible states of the media device. Alternatively, such results may occur if a TV advertisement appears having the known symbol. However, if that known symbol fails to appear in the expected ROI, no change of state is deemed to have occurred.

Figure 15:
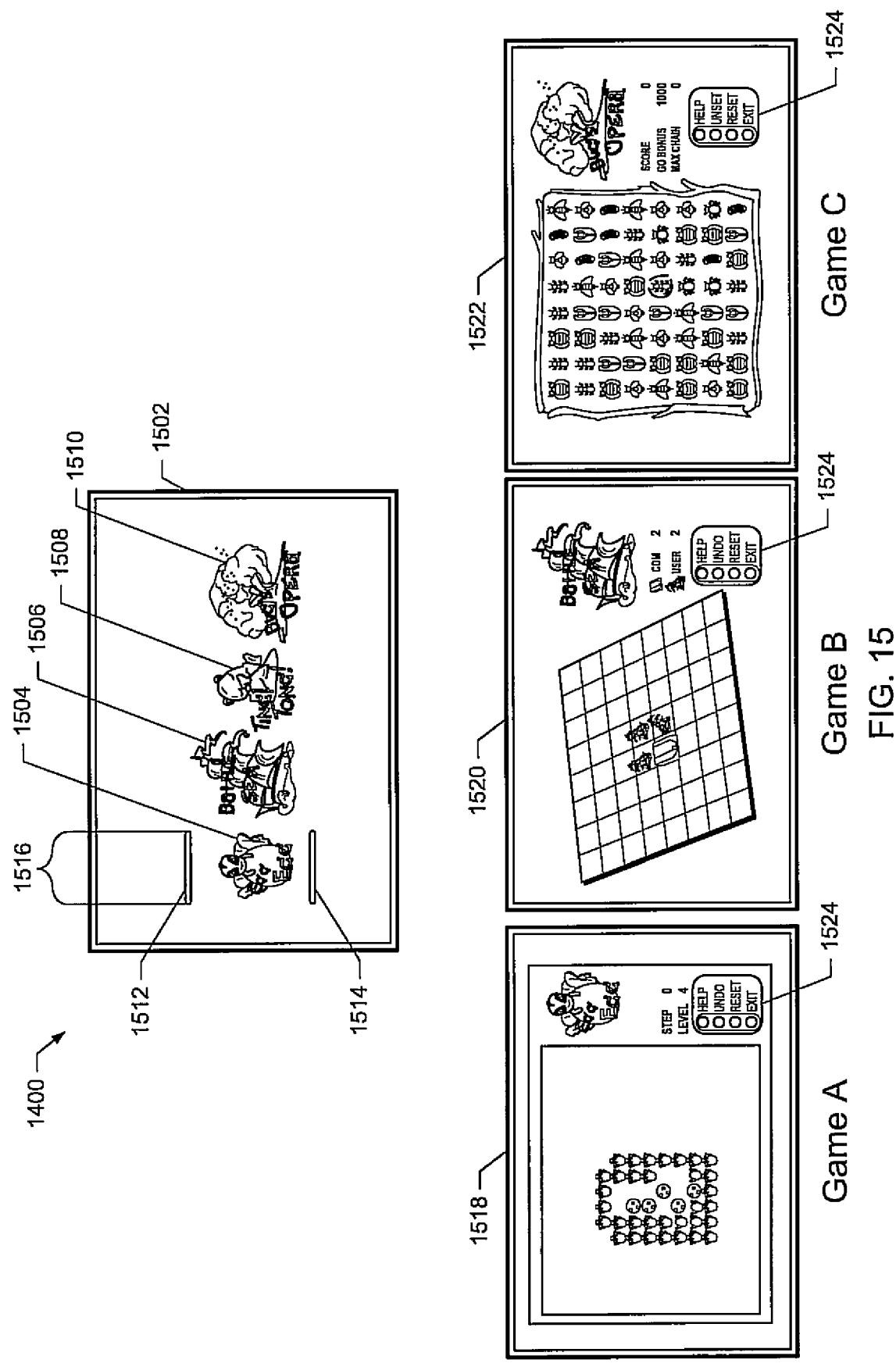
FIG. 15 depicts example screens illustrating video games having identifiable regions of interest.

As discussed above, determining viewer activity and/or identifying one or more media devices used by the viewers is not limited to changing channels and/or set-top boxes. FIG. 15 illustrates example game screens 1500 that may be generated by a stand-alone game console or as part of a set-top box functionality. The OSMSD 112 may, after a video frame of the TV is captured, identify a "Select Game" screen 1502 based on detection of particular game icons 1504, 1506, 1508, and 1510. Additionally, or alternatively, the "Select Game" screen 1502 may be identified by virtue of other on-screen symbols, such as a top horizontal bar 1512 and/or a bottom horizontal bar 1514 within a particular ROI 1516. Each of the individual games that correspond to the game icons 1504, 1506, 1508, and 1510 may include additional layers of screens related to game play. While the OSMSD memory 216, 252 could be populated with exhaustive detail about the graphic layout for each game, certain common characteristics of each game may be exploited to conserve memory needs and/or processing power. For example, each of game "A" 1518, game "B" 1520, and game "C" 1522 include a common menu graphic 1524 in a lower right-hand ROI. As such, the OSMSD 112 need not extract ROI information from the whole viewing screen, thereby saving considerable processing resources and/or memory for other purposes. If the common menu graphic 1524 should ever disappear from the expected ROI, the OSMSD may perform an analysis on alternate focused ROIs pursuant to a known state diagram, similar to the state diagram discussed in FIG. 13B.

Figure 16:
FIG. 16 depicts an example mosaic screen.

The OSMSD 112 may also detect user activity with interactive content, such as mosaics, weather, horoscopes, lotteries, and/or help screens. Active screens typically include some user input, such as, for example, preferred channels to view in a single mosaic, regions of interested weather data, birth information for horoscope results, local regions of lottery numbers, and/or help topics for results from help screens. Each of the active screens typically includes identifiable symbols, words, and/or icons unique to the particular feature. For example, FIG. 16 illustrates an example mosaic screen 1602 containing seven news broadcast programs simultaneously displayed to a user. The OSMSD 112 may identify such a mosaic by virtue of a combination of letters that spell "News Mix" 1604 in a ROI near the top-center of the screen 1602.

Other features and/or operating modes of one or more media devices may be detected by the OSMSD 112 without limitation. While some media devices may ship from a manufacturer with a predetermined plurality of features and/or states (e.g., embedded in firmware), other media devices, such as set-top boxes, may present the viewer with a wide variety of services and/or features as they become available. Broadcasters not only provide users with a rich set of multimedia content, but may also supply a diverse set of services, including home shopping, mosaics, gambling, games, VOD, and/or other media enhancement features. As new features and/or state diagrams of media devices become available, such as new DVD players, VCRs, set-top boxes, video game consoles and the games played thereon, such state diagrams may be uploaded to memory 208 and/or other storage devices 216 of the OSMSD 112.

Figure 17:
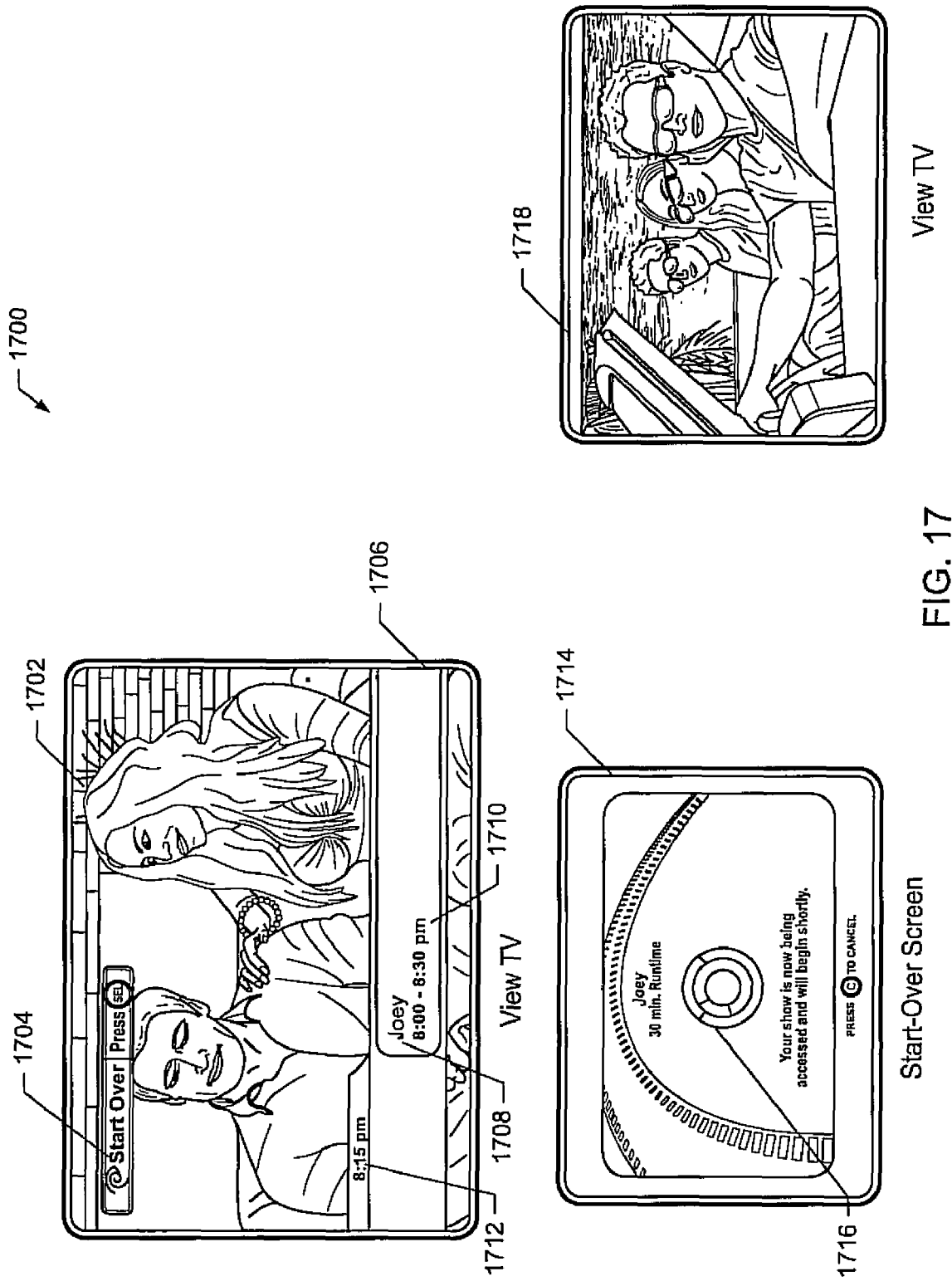
FIG. 17 depicts an example series of screens displayed for a start-over feature.

One additional feature includes a start-over service (SOS). Viewers that miss the beginning of a broadcast program may invoke the SOS to restart the broadcast program, rewind, and/or pause the program. The SOS is particularly useful for viewers that experience unexpected delays, which prevent the viewer from watching any particular broadcast at its normally scheduled time. FIG. 17 illustrates example screenshots 1700 of the SOS, which include symbols, icons, and/or banners in predetermined ROIs for the OSMSD 112 to monitor and identify. For example, a user may select the SOS feature from a remote control and/or a button panel on a set-top box during a live broadcast 1702 of a program. Selecting the SOS feature causes an SOS feature confirmation banner 1704 in an upper left ROI of the live broadcast 1702 screen. Additionally, a lower banner 1706 is shown to the viewer to provide a program title 1708, a scheduled broadcast time 1710 (e.g., 8:00-8:30 pm), and a current time 1712 (e.g., 8:15 pm). Prior to invoking the SOS, the viewer may determine how much of the broadcast program was missed, in this example case, half of the program has already aired. If the user decides to affirmatively respond to the SOS feature confirmation banner 1704 and re-start the program, then the user will be presented with an SOS splash screen 1714. The SOS splash screen 1714 includes an SOS symbol 1716 in a center ROI, which may be detected by the OSMSD 112. The splash screen 1714 assures the user that the SOS is initiating prior to displaying the beginning of the program 1718.

The SOS may be detected by the OSMSD 112 in a manner similar to that discussed in view of FIGS. 12A-12E, in which the OSMSD 112 detected VOD via a sequence of ROI's. Much like the example state diagram if FIG. 13B, the SOS may also exhibit predictable ROI sequences detectable by the OSMSD 112.

A block diagram of an example on-screen display reader (OSDR) system 1800 is illustrated in FIG. 18A. The example OSDR system 1800 includes a framegrabber 1804 which may be substantially similar or identical to the framegrabber 108 of FIG. 1. A video signal having, for example, a video frame rate of 30 frames/sec is provided as an input to the framegrabber 1804. The framegrabber 1804 captures screenshots of the input video signal at a predetermined rate, such as, for example, one screenshot every 120 ms or, equivalently, a rate of 8.3 screenshots/sec. The captured screenshots are provided to an OSDR 1808 for processing. In the instant example, the OSDR 1808 analyzes each screenshot at the aforementioned predetermined screenshot rate to determine, for example, whether a given screenshot contains content of interest and, if so, processes the screenshot containing such content. Thus, the processing performed by the OSDR 1808 on a first screenshot must be completed before the arrival of a second screenshot. As such, the OSDR 1808 may require significant processor resources to meet this real-time processing constraint.

Figure 19:
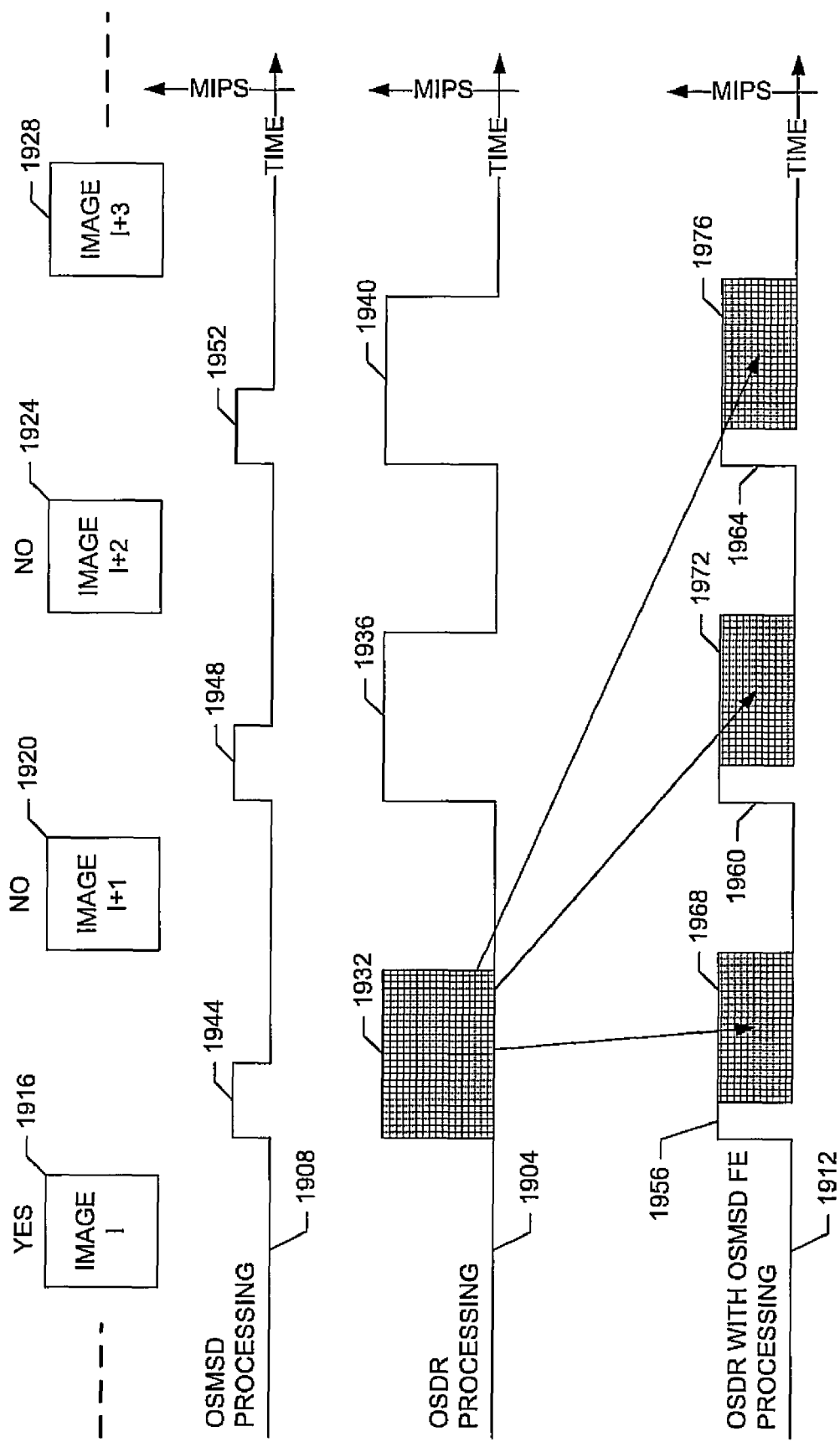
FIG. 19 illustrates a set of example processing timelines corresponding to the example OSDR and OSMSD systems of FIGS. 18A-18B.

FIG. 18B illustrates a block diagram of an example OSDR system 1850 that employs an OSMSD 1854 as a front-end filter. The OSMSD 1854 may be substantially similar or identical to the OSMSD 112 of FIG. 1. The example system 1850 includes the framegrabber 1804 and the OSDR 1808 discussed in connection with the example OSDR system 1800 of FIG. 18A. However, in the instant example, the OSMSD 1854 processes the screenshots received from the framegrabber 1804 at the predetermined screenshot rate (e.g., one screenshot every 120 ms) before providing such screenshots to the OSDR 1808. Thus, the OSMSD 1854 may be configured to analyze each input screenshot for content of interest and to provide only screenshots containing such content to the OSDR 1808. In this way, the average rate at which screenshots are provided to the OSDR 1808 of the example system 1850 may be significantly reduced from the starting predetermined screenshot rate (e.g., significantly less than the starting rate of one screenshot every 120 ms). By reducing the average input screenshot rate, it may be possible to significantly reduce the processor requirements for the OSDR 1808 as indicated in FIG. 19 below. Additionally, the OSMSD 1854 may be configured to provide original and/or quantized (e.g., black-and-white) versions of the selected screenshots to the OSDR 1808 based on the requirements of a given application.

FIG. 19 illustrates example processing timelines for the example system 1800 of FIG. 18A and the example system 1850 of FIG. 18B. For each of the processing timelines 1904, 1908, 1912 in FIG. 19, the horizontal axis represents time and the vertical access represents the processor speed (e.g., measured in millions of instructions per second or MIPS) required to perform the respective processing in the indicated amount of time. Thus, the area under each processing timeline 1904, 1908, 1912 represents the number of instructions required to perform the respective processing (e.g., MIPS*seconds=millions of instructions).

A sequence of four (4) screenshots 1916, 1920, 1924, 1928 captured by the framegrabber 1804 of FIG. 18A or 18B is shown in FIG. 19. For the example system 1800 of FIG. 18A, the processing timeline corresponding to the OSDR 1808 is represented by the timeline 1904. The OSDR 1808 in FIG. 18A is configured to process each input screenshot and, as expected, the timeline 1904 shows three processing regions 1932, 1936 and 1940 corresponding to the screenshots 1916, 1920, and 1924, respectively. Due to the real-time processing constraints for the OSDR 1808 of FIG. 18A (e.g., the processing of a screenshot (e.g., screenshot 1916) must be completed before the arrival of the next screenshot (e.g., screenshot 1920)), the OSDR 1808 may require significant processor resources (e.g., as indicated by the height of the processing regions 1932, 1936, 1940).

The processing timeline for an OSMSD, such as the OSMSD 1854 of FIG. 18B, to process each screenshot 1916, 1920, 1924 is represented by the timeline 1908. As discussed previously, the OSMSD 1854 may be configured to search for only specific objects (e.g., channel numbers, ROIs, symbols, icons) in black-and-white (binary) versions of the screenshots 1916, 1920, 1924. Thus, the processing requirements for the OSMSD 1854 may be significantly less than those for the OSDR 1808 (e.g., as indicated by the reduced heights and widths of the OSMSD processing regions 1944, 1948, 1952 as compared to the OSDR processing regions 1932, 1936, 1940, respectively).

To illustrate the potential benefit of using the OSMSD 1854 (e.g., having lower processor requirements as indicated by the timeline 1908) with the ODSR 1808 (e.g., having higher processor requirements as indicated by the timeline 1904), the processor timeline corresponding to the example system 1850 of FIG. 18B is represented by the timeline 1912. In the example system 1850, the OSMSD 1854 is configured to process each input screenshot 1916, 1920, 1924, etc., as indicated by the processing regions 1956, 1960 and 1964, respectively. In the example scenario of FIG. 19, the screenshot 1916 contains content of interest, whereas the screenshots 1920 and 1924 do not. Thus, the OSMSD 1954 may be used to select the screenshot 1916 for processing by the OSDR 1808 and to discard the screenshots 1920 and 1924. Thus, the time required by the OSDR 1808 to process the screenshot 1916 may now be spread across the time associated with screenshots 1920 and 1924 as well. In other words, the real-time constraints faced by the OSDR 1808 may still be met if the original processing region 1932 required by the OSDR 1808 in the system 1800 is spread over the processing regions 1968, 1972 and 1976 in the case of the OSDR 1808 in system 1850. As such, the OSDR 1808 as used in the system 1850 having the OSMSD 1854 front-end filter may have significantly lower processing requirements (e.g., as indicated by the reduced heights of the processing regions 1968, 1972, 1976) than the OSDR 1808 as used in the example system 1800.

Although certain methods, apparatus and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

We claim:

1. A computer implemented method to identify an active household media source device, comprising:
receiving a video signal;
analyzing a portion of the video signal associated with a display region of interest, wherein the video signal is provided to a display device by the active household media source device;
comparing the portion of the video signal to a template programmed state diagram comprising a plurality of device modes, each device mode corresponding to an image and associated with a candidate next mode, to identify the active household media source device from a plurality of household media source devices that are not providing the video signal to the display device; and
generating an output including the identified active household media source device.

2. A method as defined in claim 1, wherein the template comprises an expected video image at the region of interest.

3. A method as defined in claim 2, further comprising associating the active household media source device with the video signal when the expected video image is detected in the region of interest.

4. A method as defined in claim 1, wherein analyzing the portion of the video signal comprises quantizing the portion of the video signal to generate a quantized video signal.

5. A method as defined in claim 4, further comprising applying a quantization threshold to generate the quantized video signal, the threshold specifying at least one of a color density, a pixel intensity, or a pixel density.

6. A method as defined in claim 1, wherein analyzing the portion of the video signal comprises detecting an edge of the portion of the video signal.

7. A method as defined in claim 6, wherein the edge of the portion of the video signal comprises a quiet area surrounding the portion of the video signal.

8. A method as defined in claim 1, wherein the display device comprises a television.

9. A computer implemented method to identify video output from an alternate household media source device, comprising:
monitoring a region of interest of a video signal for a first image;
comparing the first image to a stored image programmed state diagram comprising a plurality of device modes, each device mode corresponding to an image and associated with a candidate next mode, the first image associated with one of a plurality of household media source devices capable of outputting the video signal to a display device;

confirming current video output from the alternate household media source device when the image associated with the candidate next mode differs from the first image and is associated with a secondary criterion to identify the alternate household media source device from a plurality of household media source devices that are not providing a video signal to the display device; and generating an output including the confirmed alternate household media source device.

10. A method as defined in claim 9, wherein the secondary criterion comprises at least one of a second image located in a second region of interest, a quiet area, a presence of a third region of interest, an absence of a fourth region of interest, or a remote control signal.

11. A method as defined in claim 9, wherein the image associated with the candidate next mode comprises a first pixel sum value and the first image comprises a second pixel sum value.

12. A method as defined in claim 11, further comprising calculating a dot product of the first and second pixel sums.

13. A method as defined in claim 12, wherein the dot product yields a positive output when the image associated with the candidate next mode and the first image are similar.

14. A method as defined in claim 12, wherein the dot product yields a negative output when the image associated with the candidate next mode and the first image are different.

15. A method as defined in claim 12, wherein the dot product constructively adds when the image associated with the candidate next mode is similar to the first image, and the dot product destructively adds when the image associated with the candidate next mode is different from the first image.

16. A method as defined in claim 9, further comprising calculating a criterion to determine if the first image differs from the image associated with the candidate next mode.

17. A method as defined in claim 16, wherein the criterion comprises a ratio of a dot product of the first image and the image associated with the candidate next mode, and the number of pixels in the first image.

18. A method to identify a media device mode comprising:
monitoring a region of interest in a video signal at a first time;
comparing the monitored region of interest to a programmed state diagram comprising a plurality of device modes to determine a media device mode candidate, each device mode corresponding to an image and associated with at least one of the media device mode candidates;
monitoring the region of interest at a second time; and
comparing the monitored region of interest to the programmed state diagram to confirm the media device mode candidate as the media device mode and to identify an active household media source device from a plurality of household media source devices that are not providing the video signal to a display device.

19. A method as defined in claim 18, wherein the programmed state diagram comprises the plurality of device modes for at least one of a set-top box, a television, a video cassette recorder, a digital video disk player, a people meter, or a game console.

20. An apparatus to monitor a video signal comprising:
a region of interest extractor to extract an image signal from a region of the video signal;
an image quantizer to quantize the extracted image signal; and
an object comparator to compare the quantized image signal with a programmed mode sequence state diagram based on firmware programming of a household media device to identify an operational viewing mode and to identify an active household media source device from a plurality of household media source devices that are not providing the video signal to a display device.

21. An apparatus as defined in claim 20, further comprising a quantizer threshold module to provide a quantization threshold to the image quantizer to at least one of decrease a pixel density, alter a pixel luminosity, or remove a pixel color.

22. An apparatus to process a video signal comprising:
a framegrabber to capture the video signal at a first rate;
a media source detector to quantize the video signal to improve image detection of a first and second region of interest; and
an on screen display reader to compare detected images in the first and second regions of interest to a programmed mode sequence state diagram to identify an active household media source device from a plurality of household media source devices that are not providing the video signal to a display device when the compared images in the first and second regions of interest match a sequence of images associated with the programmed mode sequence state diagram.

23. An apparatus as defined in claim 22, wherein the media source detector further comprises a quantizer threshold to adjust at least one of a pixel density, a pixel color, or a pixel luminosity.

24. A computer implemented method, comprising:
capturing a screenshot generated by a media device;
determining image regions of interest based on an operating mode of the media device and a programmed state diagram corresponding to the media device; and
identifying a current operating mode of the media device by analyzing at least one of the image regions of interest within the screenshot to identify an active household media source device from a plurality of household media source devices that are not providing a video signal to a display device.

25. A method as defined in claim 24, further comprising identifying a plurality of candidate next operating modes based on the identified current operating mode of the media device.

* * * * *